United States Patent [19]

Sridhar et al.

[11] Patent Number: 5,347,539
[45] Date of Patent: Sep. 13, 1994

[54] HIGH SPEED TWO WIRE MODEM

[75] Inventors: Manickam R. Sridhar, Norton; Aniruddha Mukherjee, Framingham; John L. Moran, III, Millville, all of Mass.

[73] Assignee: Codex Corporation, Mansfield, Mass.

[21] Appl. No.: 4,037

[22] Filed: Jan. 15, 1993

Related U.S. Application Data

[62] Division of Ser. No. 685,571, Apr. 15, 1991, Pat. No. 5,214,637.

[51] Int. Cl.⁵ .................. H04B 1/38; H04L 5/16; H04L 5/14; H04J 15/00
[52] U.S. Cl. .......................... 375/8; 375/38; 375/40
[58] Field of Search .............. 375/7, 8, 38, 40; 370/24, 32, 54; 455/62, 69; 340/825.01; 371/68.1, 68.2

[56] References Cited

U.S. PATENT DOCUMENTS

| 4,862,456 | 8/1989 | Giorgio | 375/38 |
| 4,985,904 | 1/1991 | Ogawara | 340/825.01 |
| 5,010,550 | 4/1991 | Hirata | 340/825.01 |

*Primary Examiner*—Stephen Chin
*Assistant Examiner*—Duane Kobayashi
*Attorney, Agent, or Firm*—Darleen J. Stockley

[57] ABSTRACT

A two wire modem selects a carrier frequency in a baud rate from a predetermined plurality of carrier frequencies and baud rates to communicate with another modem over a communication media in a full duplex mode based on signal and echo characteristics of the communication media estimated by the modem. In addition, the processes of estimating channel characteristics and estimating range are combined in a common start up procedure comprising a plurality of successive time segments for a call modem to communicate with an answer modem over a communication media. Still further, a method is provided for switching from a primary communication media connection to a secondary connection of a data communications network for communication by first and second modems coupled to the network. More specifically, when a failure is detected in the primary connection, the secondary connection is qualified before switching thereto. Similarly, while communicating over the secondary connection, the primary connection is qualified so that communication may be restored thereto at some later time.

5 Claims, 18 Drawing Sheets

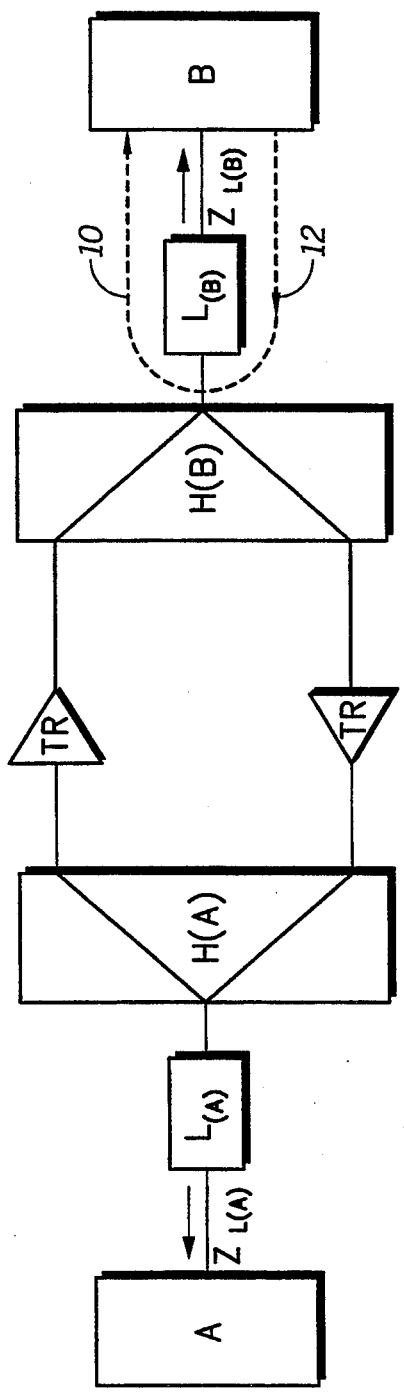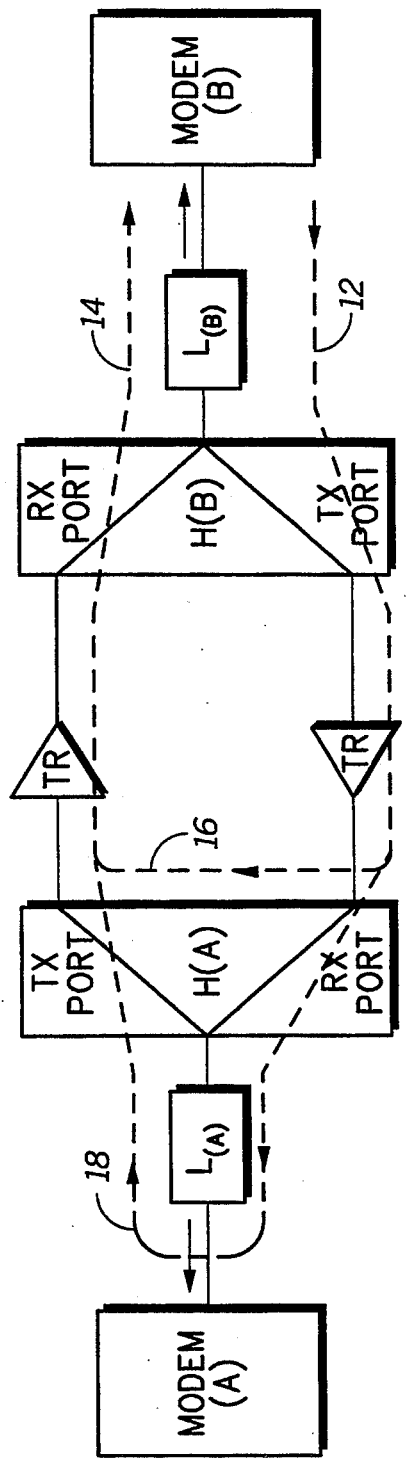

HIGH SPEED TWO WIRE MODEM

This is a division of copending application Ser. No. 07/685,571, filed on Apr. 15, 1991, U.S. Pat. No. 5,214,637.

BACKGROUND OF THE INVENTION

The present invention relates to modems, in general, and more particularly to a modem for selecting a carrier frequency and a baud rate from a predetermined plurality of carrier frequencies and baud rates to communicate with another modem over a communication media of a data communications network in a full duplex mode the selection being based on estimated characteristics of the communication media, and a method of operating a modem by combining the processes of estimating channel characteristics and estimating range in a common startup procedure comprising a plurality of successive time segments.

In a data communication network, digital data among other data, may be communicated at a data bit rate from one modem to another modem through a communication media, which may be a leased line of the network or a dial up connection of a general switched telephone network (GSTN), for example. Generally, modems operate at a fixed carrier frequency and a fixed modulation or baud rate and attempt to optimize the data exchange bit rate based on the conditions of the communication media over which they are communicating. In order to accomplish an optimum data bit rate, contemporary modems utilize a startup learning procedure before commencing communication during which the modems perform certain predefined start up procedures which may include a line probing sequence, for example, to establish the media characteristics over which communication will take place. The current state of the art CCITT standard for two wire full duplex modems is V.32 and V.32bis. An example of a modem employing the V.32 standard today includes the Codex Model 2264. An example of a state of the art modem using line probing is the Codex Modem Model 3680.

In addition, two wire modems for operating in a full duplex mode generally employ an echo canceller to cancel from the received signal any near end and far end echoes resulting from its concurrent signal transmissions. These modems include a ranging sequence as part of the startup procedure to determine the round trip signal delay time over the media to and from a remote modem which is used by the echo canceller thereof. The ranging task is performed separate and distinct from any line probing tasks. Further, in two wire, full duplex transmission systems, there are system nonlinearities which affect not only the signal transmission, but also both of the near end and far end echoes resulting therefrom. Conventional line probing training sequences do not measure the nonlinearities of the echo signals and, for this reason, cannot provide adequate estimates for echo cancellation purposes.

Still further, if during data communication between two modems, a malfunction, like loss of synchronization, is detected, the modems presently on the market resort to breaking communications and repeating the entire startup procedure, including both line probing and ranging tasks, which is a very lengthy and cumbersome retraining process. Moreover, only one of the communicating modems is generally designated to initiate this retraining process upon malfunction which adds further complications.

The present invention offers aspects intended to alleviate the aforementioned drawbacks of the current modems. These aspects will be better understood from a description of the preferred embodiment found hereinbelow taken together with the accompanying drawings.

SUMMARY OF THE INVENTION

In accordance with the present invention, a two wire modem selects a carrier frequency and a baud rate from a predetermined plurality of carrier frequencies and baud rates to communicate with another modem over a communication media in a full duplex mode based on estimated characteristics of the communication media. The two wire modem comprises means for transmitting for a first predetermined time interval a first line probing signal of varying frequency content over the communication media, means for receiving at least one echo signal of the first line probing signal from the communication media in the first predetermined time interval, means for receiving a second line probing signal of varying frequency content from the communication media in a second predetermined time interval, means for estimating signal characteristics of the communication media based on an analysis of the received second line probing signal and for estimating echo characteristics of the communication media based on an analysis of the received at least one echo signal of the first line probing signal, and means for selecting the carrier frequency and baud rate from the predetermined plurality of carrier frequencies and baud rates based on the estimates of the signal and echo characteristics of the communication media.

In another aspect of the present invention the processes of estimating channel characteristics and estimating range are combined in a common start up procedure comprising a plurality of successive time segments for a call modem to communicate with an answer modem over a communication media. A frequency spectrum of the communication media is considered the channel. A round trip delay over the channel between the call and answer modems is considered the range. The combined procedure comprises the steps of: estimating a range for one of the call and answer modems in one time segment of the plurality of successive time segments of the start up procedure, estimating signal characteristics of the channel for the one modem in a second time segment of the plurality while concurrently estimating echo characteristics of the channel for the other of the call and answer modems, estimating a range for the other modem in a third time segment of the plurality and estimating signal characteristic of the channel for the other modem in a fourth time segment of the plurality while concurrently estimating echo characteristics of the channel for the one modem.

Another aspect of the present invention involves a method of switching between primary and secondary communication media connections of a data communication network. The primary and secondary connections are used for communication by first and second modems coupled to the network. The method comprises the steps of: communication data between the first and second modems over the primary connection, detecting a failure in the primary connection, and response to the failure detection, qualifying a secondary connection, switching communication of the first and second modems from the failed primary to the qualified secondary connection, while communicating data between the first and second modems over the qualified secondary connection, qualifying the primary connection, and restoring communication of the first and second modems from the secondary to the qualified primary connection and repeating the first step.

BRIEF DESCRIPTION OF THE DRAWINGS

FIGS. 1 and 2 are block diagram illustrations of an exemplary data communications network model suitable to describe the background environment of the present invention.

DESCRIPTION OF THE PREFERRED EMBODIMENT

Figure 3A:
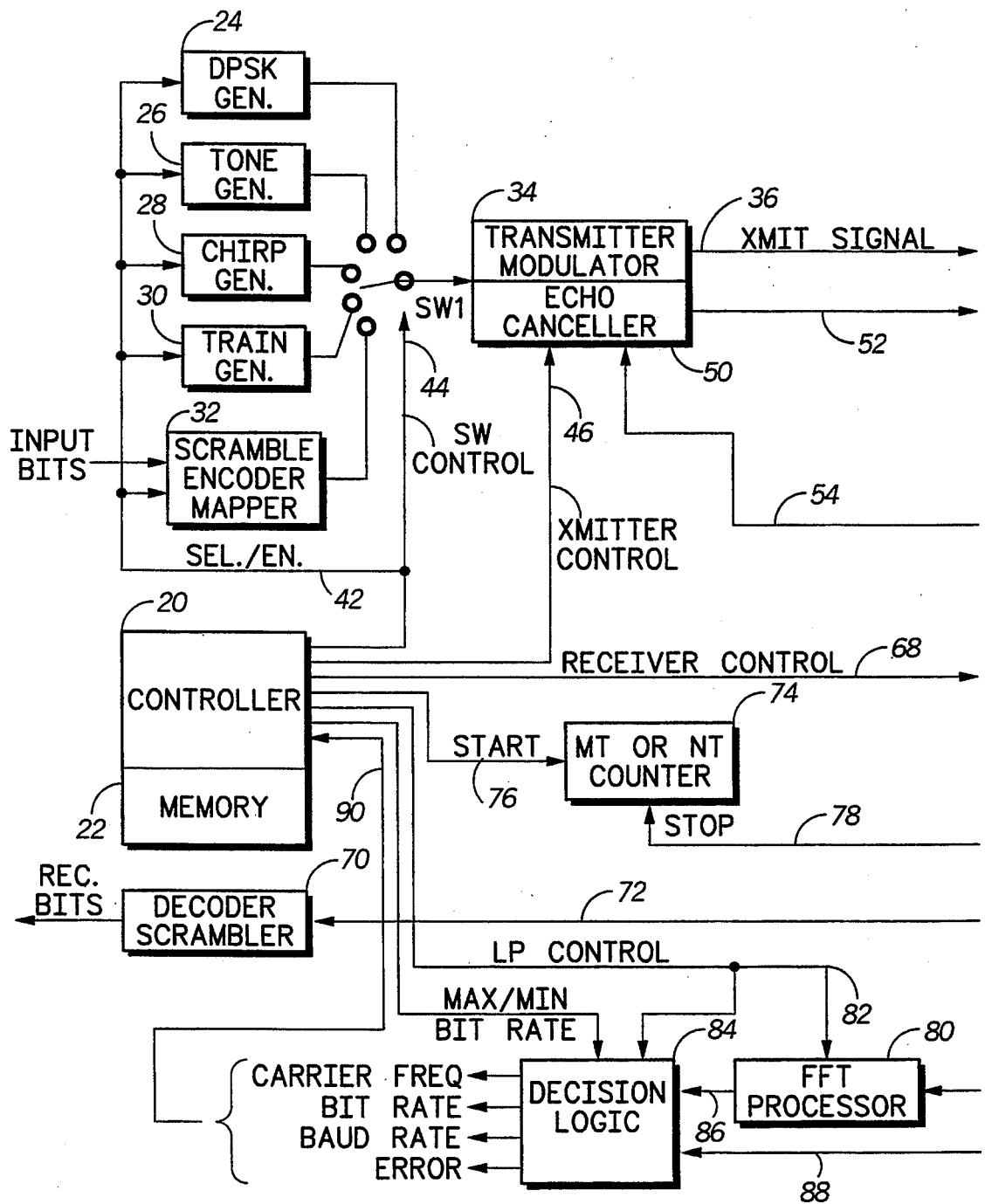
FIGS. 3A and 3B depicts a functionally block diagram schematic of a two wire modem capable of operating in a full duplex mode and suitable for embodying the principles of the present invention.

FIGS. 1 and 2 are block diagram illustrations of an exemplary data communications network model in which two modems denoted as A and B, of the two wire variety are communicating through a general switched telephone network (GSTN). In the present example, the modems A and B are coupled to the GSTN over two wire line connections to hybrids H(A) and H(B), respectively, which convert the two wire connections to four wire connections of the GSTN. Loop losses of the two wire connections, coupling modems A and B to the GSTN, are represented by the blocks L(A) and L(B), respectively, and the reflected respective impedances are represented by $Z_L(A)$ and $Z_L(B)$. The trunk losses of the network are lumped according to direction of signal communication and are represented by the directional triangles TR.

The illustration of FIG. 1 is used to depict a near-end echo signal 10 resulting from the transmitted signal 12 from modem B and reflected from the hybrid H(B). The illustration of FIG. 2 depicts a composite signal 14 comprising at least two far end echo signals 16 and 18 resulting from the transmitted signal 12 from modem B. The far end echo signal 16 is a residual signal remaining as a result of a non-ideal hybrid match situation, which is commonly referred to as "trans-hybrid loss" and is dominant in most far-end echo signals. The other echo signal 18 is a residual signal remaining as a result of the transmission signal 12 traversing the local loop L(A), being reflected off the remote modem A due to a non-ideal impedance termination in a modem and traversing back along the same local loop L(A) and then combining with the echo signal 16. The echo signal 18 is generally smaller than the echo signal 16 since it goes through the loop L(A) twice and the minimum return loss (reflected signal) for a modem is on the order of 11 db in order to meet certain standards.

In operation, modem B in communicating with modem A transmits its signal 12 traversing the local loop L(B), the hybrid H(B) the trunk loss TR, the hybrid H(A) and the loop L(A), which in combination constitute the communication media between modems A and B. Concurrently therewith, modem B receives in a full duplex mode not only the transmitted signal from modem A but, in addition, the near end echo signal 10 and composite far end echo signal 14. The communication frequency spectrum of the communication media is referred to herein as the channel and the round trip delay over the channel between the call and answer modems is referred to herein as the range. Accordingly, in order to provide a viable estimate of the channel characteristics for optimizing data bit rate and echo cancellation, the near and far end echo signals including echo nonlinearities should be learned and taken into consideration as part of the training sequences at the modems A and B.

For the present embodiment, modems A and B may be implemented much the same or similar to the aforementioned modems marketed by Codex Corporation bearing Model 2264 which have been marketed more than 1 year prior to the filing date of the instant application and are described in the publication "2264 Modem Users Manual", 08789, Rev. B, published code LP, published July, 1989 by Codex Corporation. This manual or manuals are being incorporated by reference herein to provide more specific details of the structure and operation of a suitable modem used in connection of this preferred embodiment.

Figure 3B:
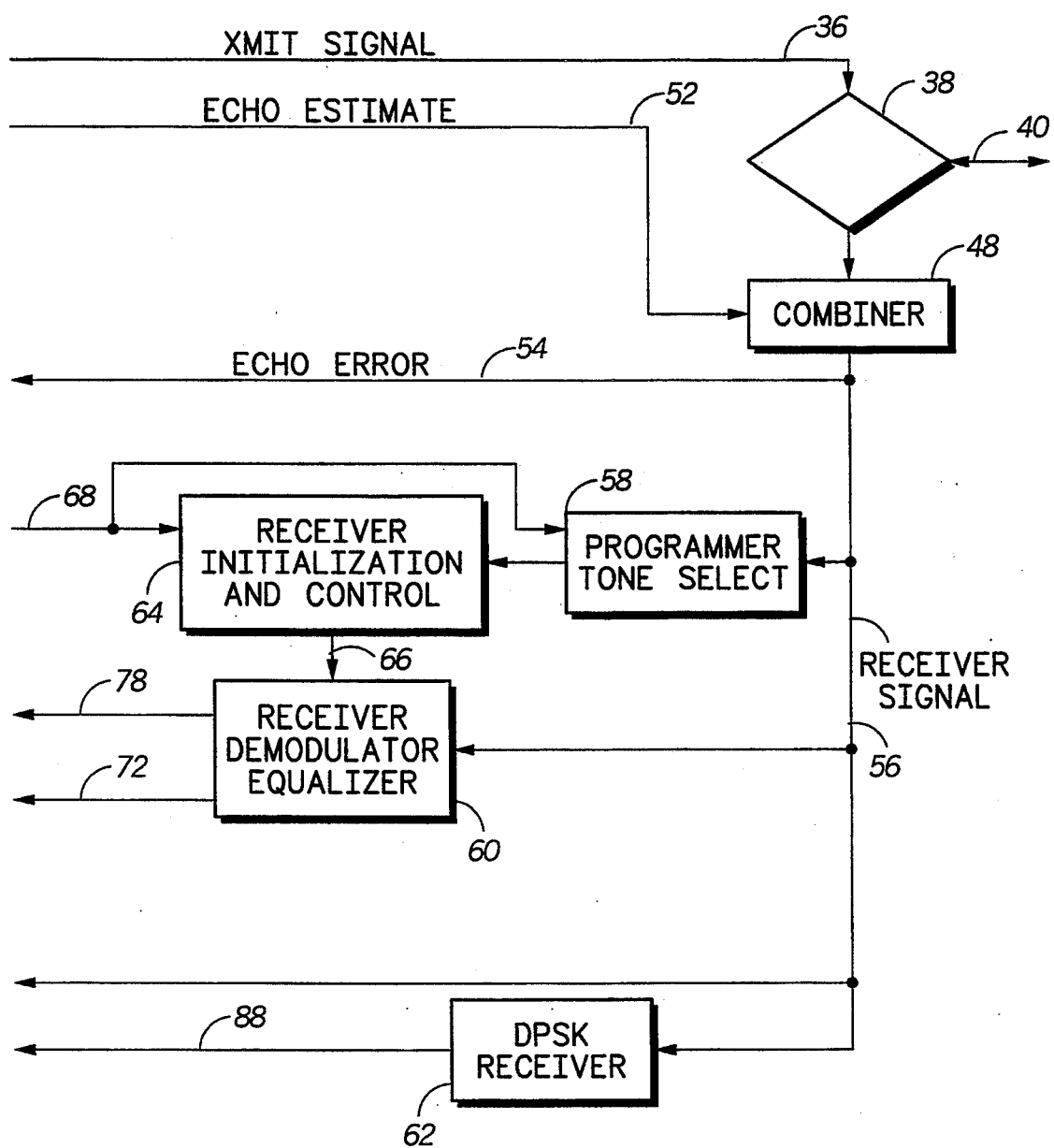

FIG. 3 depicts a functional block diagram schematic of a two wire modem capable of operating in a full duplex mode and suitable for embodying the various aspects of the present invention. As in the Codex model 2264, the function of the blocks of the embodiment of FIG. 3 may be implemented in software programs of at least one signal processor similar to the type manufactured for Codex Corporation bearing Model No. 60423-51, for example. The modem processor (s) will not be described in detail herein as the use of a signal processor(s) in the control and implementation of modem functions is considered well-known.

Referring to FIG. 3, at the heart of the exemplary modem is a functional controller module 20 which functions to provide information to the various other functional modules of the modem in accordance with a predetermined timing sequence which will be described in greater detail hereinbelow. The present modem is intended to operate with quadrature amplitude modulation (QAM) for each channel with synchronous line transmission at a selected one of the following plurality of modulation or baud rates: 2400, 2743, 2954, and 3200 as will be more fully understood from the description herebelow. The present modem is also designed to operate at the following data rates: 9600, 12000, 14400, 16800, 19200, 21600, 24000, and 25600 bits per second. In the present embodiment, the above rates may use a Codex Proprietary Precoding Modulation Scheme, combined with 4D trellis coding. Still further, a plurality of carrier frequencies which may be used by the present modem include 1600 Hz, 1670 Hz, 1745 Hz, 1828 Hz, and 1920 Hz. The receivers will operate with received frequency offsets of up to +/−7 Hz. A selected carrier frequency and baud rate from their respective pluralities will be established during a start up procedure after the line has been probed and the operational bandwidth thereof established. Information representing the aforementioned predetermined carrier frequencies, baud rates and data bit rates are all stored in the memory 22 for a selection under control of the controller 20 as will be more evident from the description found below.

It is understood without having to be shown or described that the present exemplary modem includes conventional interchange modem circuits which comply with the functionality and operational requirements of the V.24 recommendation of the CCITT and all such interchange circuits are adequately terminated in the corresponding data terminal equipment (DTE) and in the data circuits terminating equipment in accordance with appropriate recommendations for electrical characteristics. In addition, such modems shall accept and pass synchronous or asynchronous data from and to its corresponding DTE on the appropriate conventional interchange circuit and under control thereof. The timing, clocks ... etc., for example, and data rate selection switching and control are all achieved through the conventional interchange circuits.

Referring again to FIG. 3, the modem includes the following conventional signal generating functional modules: a differential phase shift keyed generator 24, a tone generator 26, a chirp signal generator 28, a train signal generator 30 and a conventional scrambler/encoder/mapper function 32 which processes the data to be transmitted. A functional switch SW1 selects the output of one of the generator modules 24, 26, 28, 30 or 32 to be an input to a transmitter/modulator functional module 34 which in turn generates a transmit signal 36. The signal 36 is conducted through a hybrid circuit 38 to the two wire connection 40 to either a leased line or dial-up line of a telephone network. The generator functions 24, 26, 28, 30 and 32 are all selected and enabled by the controller 20 via the signal path 42. In addition, the functional switch module SW1 is also controlled by the controller 20 via the switch control path 44. Still further, information related to the carrier frequency, baud rate and data bit rate along with certain control signals are provided to the transmitter/modulator 34 from the controller 20 over the data and control path 46.

Received signals are passed from the two line conductor 40 through the hybrid 38 to a combiner function 48 of the modem. A conventional echo canceller function 50 estimates an echo based on perceived characteristics of the channel in accordance information provided to it from the controller 20 via path 46. The echo canceller 50 provides the echo estimate to the combiner 48 over path 52 so that the received signal may be relieved of its echo component by the combiner 48. An echo error is provided back to the echo canceller 50 over path 54 in order to adjust the echo canceller to a more effective level.

The received signal from the combiner 48 is provided over the signal path 56 to a variety of additional functional modules of the modem including a conventional programmable tone detector module 58, a receiver/demodulator/equalizer module 60 and a DPSK receiver 62. The modem further includes a receiver initialization and control functional module 64 which initializes and controls the module 60 via the signal path 66. In addition, the tone detect module 58 and initialization and control module 64 are governed by the controller 20 utilizing the path 68. The data output of the receiver module 60 is provided to a conventional decoder scrambler module 70 over the data path 72. The module 70 processes the data received.

Still further, the modem includes a counter 74 which is used to compute the range MT or NT, as the case may be, which will become more evident from the description found below. The counter 74 may be started by the controller 20 using path 76 and stopped by the receiver 60 using path 78.

In the present embodiment, a conventional Fast Fourier Transform FFT processor 80 operates on the received signals at selected times to estimate channel characteristics and select a communication parameter combination of carrier frequency, baud rate and data bit rate under control of the controller 20 via data path 82. The resulting parameter combination is provided to a decision logic function 84 over the data path 86. In addition, the selected communication parameter of the remote modem are received by the DPSK receiver 62 and provided to the decision logic module 84 using the path 88. The decision module 84 decides the carrier frequency, baud rate and data bit rate for use by the modem based on estimated characteristics of the channel over which it is communicating with another modem. If the decisional module 84 cannot find a carrier frequency and baud rate consistent with a desired maximum and minimum bit rate range set by the controller 20, then it generates an error signal (ERROR). The combined carrier frequency, baud rate and data bit rate information and ERROR signal are all provided from the decisional logic module 84 to the controller 20 over the signal path 90 for storage in the memory module 22 thereof.

The foregoing described modem may be controlled to initiate a call and thus, be operated in a call mode (hereinafter referred to as a call modem) or may be controlled to answer a call, and thus, be operated in an answer mode (hereinafter referred to as an answer modem).

An example of operation of the preferred modem embodiment described in connection with the schematic block diagram of FIG. 3 will now be supplied in connection with the communication between a call/answer two wire modem pair which intend to communicate over a communication media such as a lease line or dial-up line of a telephone network like that described in connection with the network models of FIGS. 1 and 2, supra. The signal flow illustrations of FIGS. 5–12 depict the "handshaking" signal exchange between a call and answer modem pair for start up training and the initiation of retraining during conventional data transmission therebetween. Further, FIGS. 13A–13D represents suitable software programming to embody the functional modules of the call modem and FIGS. 14A–14D depict flowcharts of software programing suitable for embodying functional modules of the answer modem.

Figure 5:
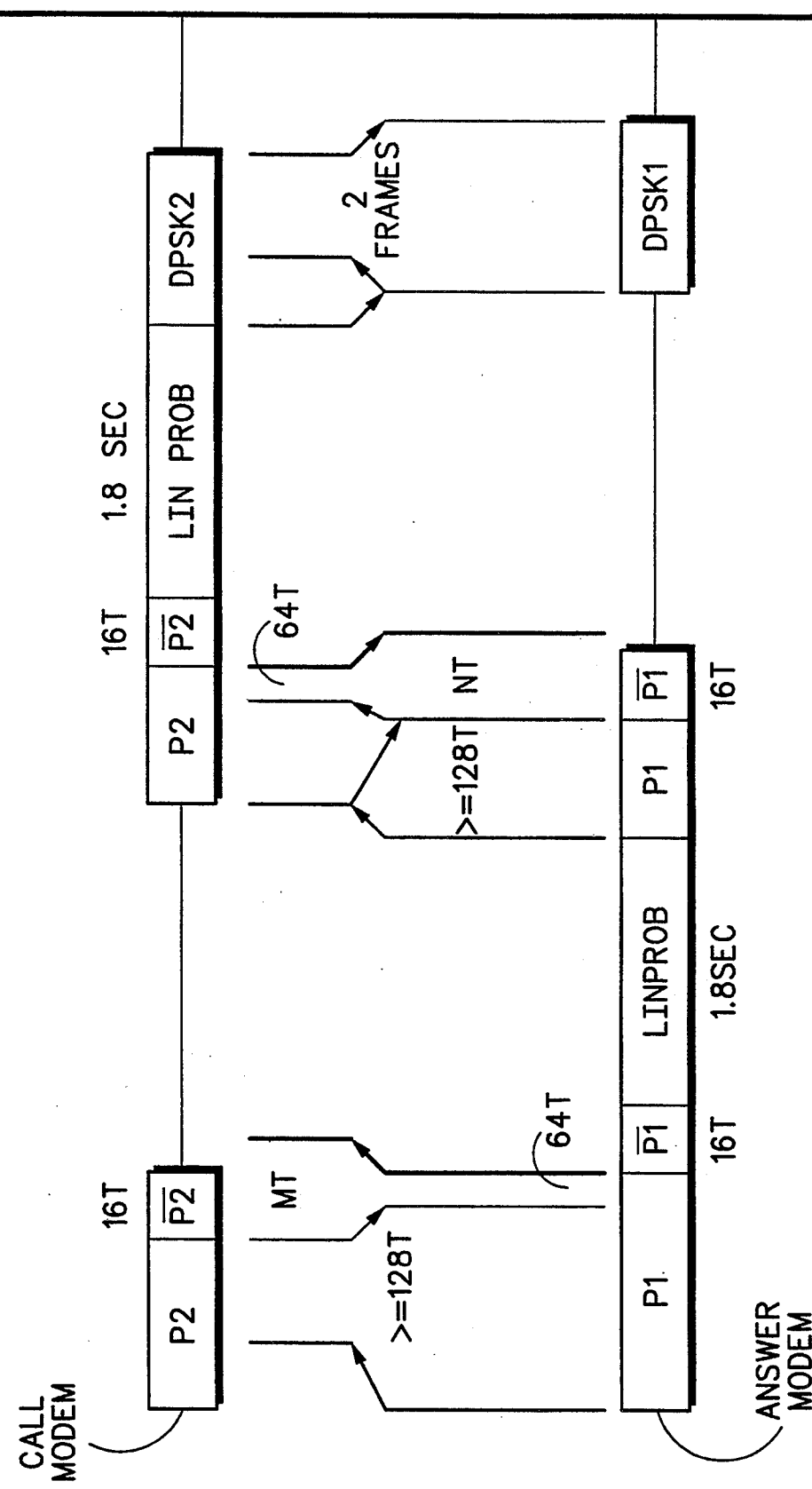
FIGS. 5–12 depict "hand-shaking" signal exchange between a modem pair for start up training and the initiation of retraining during data transmission in accordance with the principles of the present invention.
Figure 6:
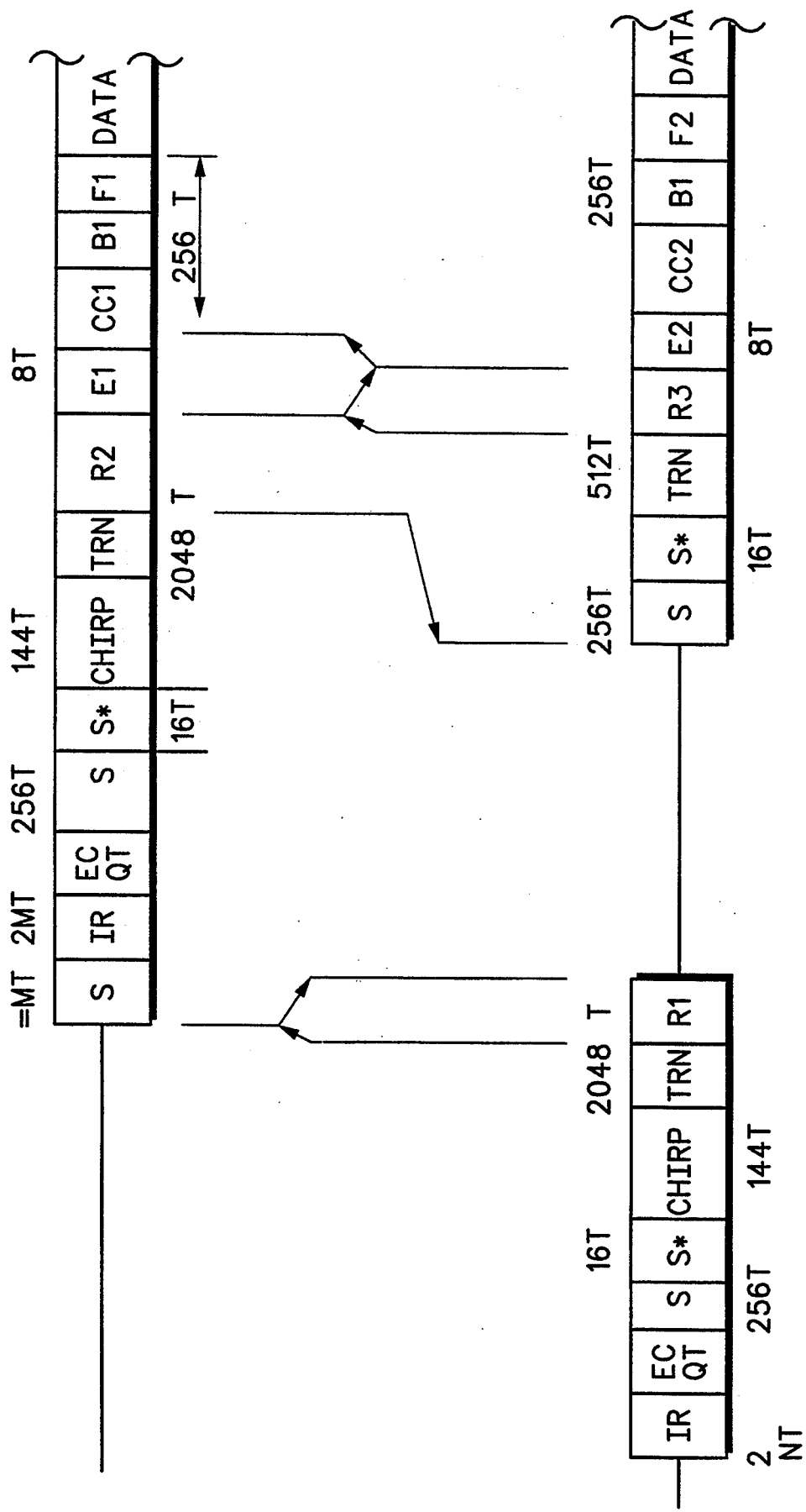

To start with, references are made to FIGS. 3, 5, 13A and 14A for purposes of describing a common start up procedure which includes line probing the telephone line connection communication media between the call and answer modems to learn the channel characteristics in estimating the round trip delay from each modem, referred to as ranging. After a call is initiated from a call modem, the answer modem on connection to the line, shall transmit an answer back tone as recommended by V.25 and then commence transmitting a pilot tone P1 as shown in FIG. 5 and flowchart block 100. To accomplish this, the controller 20 selects and enables the tone generator 36 to generate a tone at 400 and 2800 Hz (P1) and controls the switch SW1 to pass the generated tone to the transmitter/modulator 34 which transmits the tone overpath 36 through the hybrid 38 and out over the two wire line 40 to the call modem. Concurrently, in block 100, the controller 20 of the answer modem initializes the module 58 for the reception of a tone at 1600 Hz (P2). At this time, both modems may be set at the symbol timing of 2400 Hz.

Simultaneously, the call modem similarly governs the transmission of the P2 tone and initializes its module 58 to receive and detect the P1 tone according to block 102. After receiving the answer back tone for at least 1 second or upon a reception of the P1 tone as detected by the module 58 in accordance with block 104, the call modem waits for at least 128 timing periods (at a symbol timing T of 2400 Hz) and then transmits the phase reversal tone $\overline{P2}$ for a period of 16 T by controlling the tone generator 26 and transmitter/modulator 34 (block 110). Concurrently therewith, the controller 20 of the call modem starts the NT counter 74. Thereafter in the flowchart block 112, the call modem initializes the detect module 58 to detect the phase reversed tone $\overline{P1}$ and controls the transmitter 34 transmit all zeroes. Then looks for the phase reversal tone $\overline{P1}$ in the decisional block 114.

After receiving the P2 tone (block 106), the answer modem initializes its detect module 58 in block 108 to detect the phase reversal tone $\overline{P2}$.

The answer modem then looks for the phase reversal tone $\overline{P2}$ in the decisional block 116 and when it receives and detects the tone $\overline{P2}$ by the module 58, it executes the flowchart block 118 which causes the controller 20 to wait for at least 64 T, and then control the tone generator 26 and transmitter 34 to transmit a phase reversal tone $\overline{P1}$ for 16 T. Thereafter, in the block 120, the controller 20 of the answer modem initializes the FFT processor 80 to compute the channel characteristics estimation resulting from received echo signals.

In the call modem, when the tone $\overline{P1}$ is detected as determined by functional block 114, the MT counter 74 is stopped by the receiver module 60 according to the instructions of block 122 and the FFT processor 80 thereof is initialized to compute an estimation of channel characteristics from a received signal. The resultant digital count of the MT counter 74 is representative of the round trip delay or range between the two modems and is stored in the memory 22 by the controller 20 for later use in controlling the echo canceller 50.

In the present state, both the call modem and answer modem are initialized to estimate channel and noise characteristics which is accomplished by one modem transmitting a known broad band signal, such as a chirp signal and, at the same time, receiving the echo signal therefrom, while the other modem at the remote end receives the chirp signal. Both modems, estimate the channel and noise characteristics from their respective receive signals.

In the present embodiment, according to the flowchart block 124, the controller 20 of the answer modem controls the chirp generator 28, switch SW1 and transmitter 34 to transmit a line probing chirp signal which is a periodic signal comprised of a series of tones spaced at 37.5 Hz apart within a frequency band of approximately 100–3600 Hz. Within this frequency band, 3 nulls are transmitted in place of the tones where one measures the nonlinear distortion, if any, introduced by the channel of the communication media. The line probing chirp signal repeatedly transmitted at least 64 times for approximately 1.8 seconds by the answer modem during which time it is receiving echo signals which are conducted to the FFT processor 80 and analyzed for estimating echo characteristics of the communication media.

Similarly, the instructions of block 126 cause the controller 20 of the call modem to activate the FFT processor 80 to perform and analyze the received line probing chirp signal from the answer modem for estimating the signal characteristics of the communication media. Each receiving modem estimates its respective media characteristics of the broad band signal by averaging its spectrum over 64 periods which is the number of chirp signal periods being generated. Averaging over 64 periods by the FFT processor, provides about 18 db of noise rejection which just about cancels out any random noise leaving behind only the known transmitted signal or echo signal linearly and nonlinearly distorted by the channel. The functional block diagram schematic of FIG. 4 offers a series of modules suitable for embodying an FFT processor for performing the estimation of signal or echo characteristics of the communication media.

Figure 4:
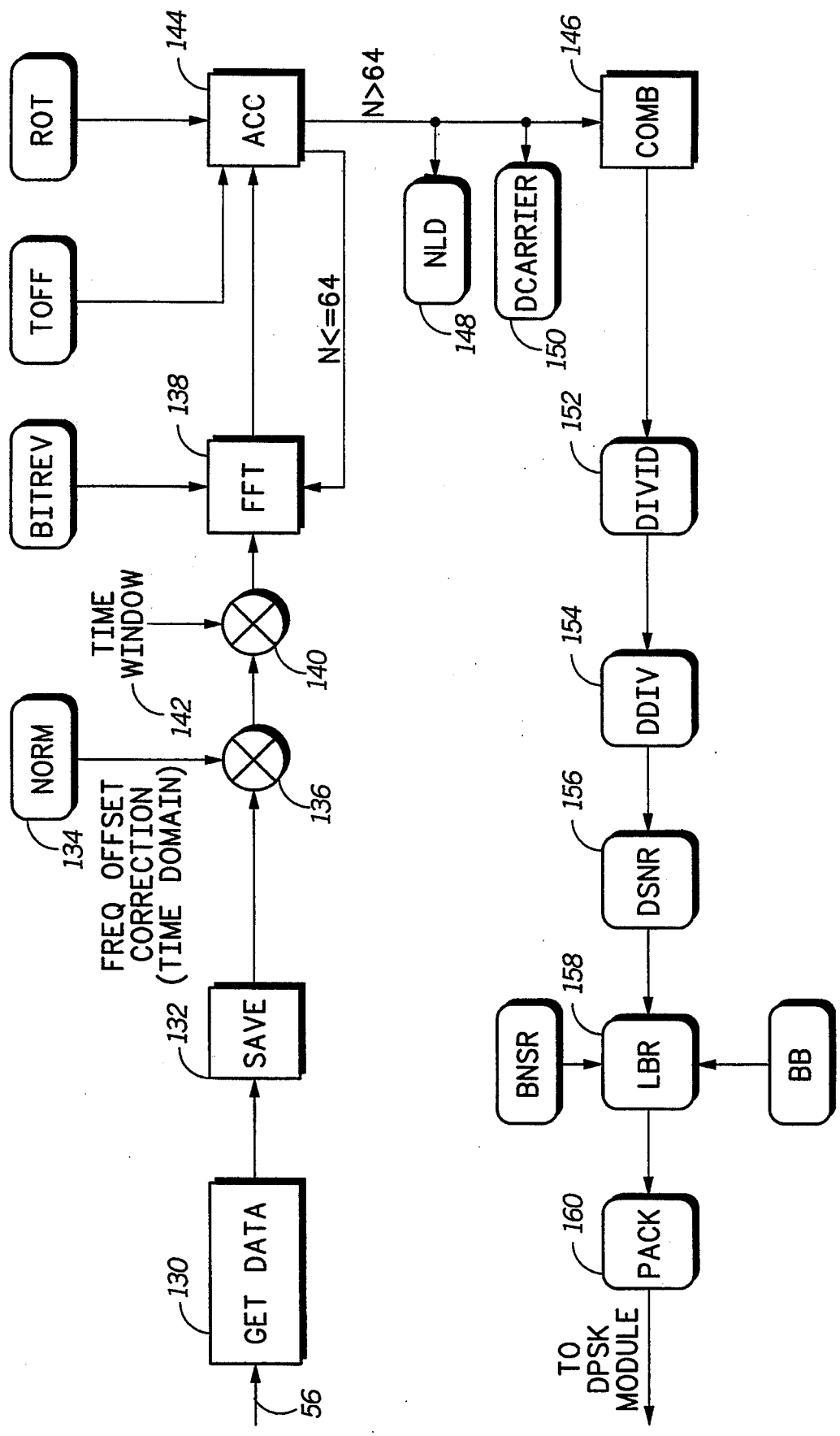
FIG. 4 is a functional block diagram schematic of a series of modules suitable for embodying an FFT processor for performing the estimation of signal or echo characteristics of the communication media for use in the embodiment of FIG. 3.

Referring to FIG. 4, the incoming tones of the line probing chirp signal or echo signal thereof, as the case may be, are gathered in the block 130 and saved in a temporary memory buffer according to the functional block 132. Since the channel may introduce a frequency offset which could make the received signal non-periodic, a frequency offset correction is accomplished, using the frequency offset of block 134 and mixer 136, prior to computing the Fourier transform thereof.

A 256 point FFT processing algorithm 138 is used, in the present embodiment, for computing the received signal to noise ratio over a predetermined frequency spectrum or a received signal to echo ratio over the same predetermined frequency spectrum. For this computation, 512 time samples or points are gated through the gate 140 at a time as governed by the time window signal 142 to the FFT 138. A power signal spectrum is computed for each of the 64 periods over the 1.8 second interval by the FFT processor 138 and stored in an accumulator 144. A timing offset correction TOFF and a frequency offset correction ROT are introduced to each result out spectrum. The individual spectrums are then averaged to yield an overall resultant spectrums to either reduce or eliminate random noise. Also in block 144, the resultant average power spectrum is squared to yield a squared spectrum which is subtracted from the original spectrum to yield a channel noise spectrum. The output of the block 144 provides both a signal power spectrum and a noise power spectrum to a combiner block 146. The nonlinear distortion introduced by the channel is also measured in block 148 by averaging the energy at the null points of the signal spectrum which were introduced by the line probing signal. A block 150 is used to hunt for an optimum carrier frequency based on the resultant spectrums.

Since the goal of the FFT processor is to maximize the data bit rate for a particular channel according to the estimated characteristics thereof, the nun%her of bits per baud that can be transmitted through the channel and received by the modem receiver for a given BER is calculated. A 2-tap DFE model is constructed and based on the channel noise spectrum, the noise at the output of the DFE model, for unit signal is also calculated. The DFE model (linear) noise, the nonlinear noise and the signal level of the various spectrums are weighted and combined in block 146 to obtain the total noise at the input of the receivers decoder. The signal to noise ratios are established in blocks 152 and 154. In block 156, the total noise including distortion above the received and echo signals are computed and scaled to unity. In block 158, the bits/baud is then computed from a fourier series approximation of the decoders signal to noise ratio. Resulting from block 158 is an optimum carrier frequency baud rate, and data bit rate within the desired data bit rate range provided from the controller 20. In block 160 the resultant information is packed in a particular format for providing it to the other modem as will be fully understood from the description herebelow.

In the decision logic block 84, a final decision algorithm chooses between the selected and received parameters of carrier frequency, baud rate and data bit rate in accordance with a predetermined criteria. The criteria used by the present embodiment in choosing between the selected and received carrier frequencies baud rates and data bit rates, is one of less than or equal to, respectively.

After the answer modem completes the 1.8 second line probing signal generation, it completes the instructions of block 124 by disabling the chirp generator 28 and controls the tone generator 26, switch SW1 and transmitter 34 to commence transmission of the tone P1 for at least 128 T. Thereafter, the controller 20 of the answer modem initializes the module 58 for the detection of the tone P2 and then waits in the decisional block 164 for the reception and detection thereof. In addition, after the call modem completes the channel estimation of block 126 for the received line probing signal, the controller 20 in response to the instructions of block 166 initializes the module 58 for the detection of tone P1 and waits for the tone P1 to be detected according to the decisional block 168. During this time, the call modem is continuing transmission of zeroes. Upon detection of the tone P1 by the module 58, the controller 20 of the call modem terminates the zero transmissions by controlling the transmitter 34 and generates the tone P2 by controlling the tone generator 26, switch SW1 and transmitter 34. At the same time, the controller 20 of the call modem initializes the module 58 for the detection of the phase reversal tone $\overline{P1}$ according to block 170. In block 172, the controller 20 of the call modem waits in a loop for the detection of the tone $\overline{P1}$ by the module 58.

When the tone P2 is detected by the module 58 of the answer modem, the controller 20 thereof responds to the instructions of block 174 and initiates transmission of the phase reversal tone $\overline{P1}$ for 16 T and concurrently starts the NT counter 74. Moreover, the instructions of block 176 cause the controller 20 of the answer modem to initialize the module 58 for the detection of the tone P2 after 16 T and, then, cause the transmitter to transmit zeroes during which time it waits in a decisional loop according to the block 178 for the reception and detection of the tone $\overline{P2}$.

After $\overline{P1}$ is detected by the module 58 of the call modem (block 172), block 180 is executed by the controller 20 thereof which governs the transmission of the tone $\overline{P2}$ for 16 T after waiting for a delay period of 64 T. Concurrently, the controller 20 of the call modem initializes its FFT processor to perform an estimation of channel characteristics based on received echo signal or signals. The detection of tone $\overline{P2}$ by the answer modem causes the receiver 60 thereof to stop the NT counter 74, and the controller 20 to initialize the FFT processor 80 thereof to perform a channel estimation based on the received line probing chirp signal. In blocks 184 and 186, the same line probing process is performed as described supra except that the call modem now is transmitting the line probe chirp signal and performing the estimated channel characteristics based on the echo signal thereof and the answer modem is performing the estimation of a channel characteristics based on the received line probing chirp signal. In the present embodiment, this channel estimation line probing procedure takes approximately 1.8 seconds.

After performing the second line probing task, the selected carrier frequency, baud rate and data bit rate cf each of the call and answer modems are provided to their respective controller 20 which in turn selects and enables the respective DPSK generator 24 to generate the learned information in packets or frames to the other modem via switch SW1 and transmitter 34. In the block 190, the controller 20 of the answer modem is directed to initiate the DPSK receiver 62 for the detection of the transmitted DPSK2 frames from the call modem.

In the present embodiment, a 300 baud DPSK modulation scheme is used to exchange the communication parameter information between the call and answer modems. A carrier frequency of 1200 Hz is used for DPSK transmission. The DPSK carrier is stored in memory of the controller 20. The data to be sent is encoded and modulated by governing the generator 24 by the controller 20 and sent out over the line 40. Since the above method of modulation (by square wave) may produce a lot of out of band energy, the carrier frequency may be stored as a digital prolate spherical wave function, to maximize the energy in a narrower band. The DPSK receiver 62, in each case, recovers the timing of the signal, demodulates and decodes it and unpacks the information from the remote modem. The information transferred between the modems consists of the bit rate index for each baud rate, the carrier frequency for each baud rate, the baud rate mask to indicate which baud rate is disabled by the host, symmetric bit rate flag and symmetric baud rate flag.

After the answer modem detects the carrier of the DPSK2 signal according to block 192, the instructions of block 194 are then executed governing the controller 20 to terminate zero transmission and transmit the DPSK1 information while receiving the DPSK2 information. The call modem shall now look for the DPSK1 carrier from the answer modem and then, after detecting two frames of DPSK1 information, shall stop transmitting the DPSK2 data and go to an idle state for approximately 20 T and then change its carrier frequency and baud rate to the one recommended by the preceding line probing procedure. Accordingly, when the answer modem detects loss of carrier from the call modem it also goes to an idle state for approximately 20 T and thereafter sets its carrier frequency and baud rate to that recommended by the decisional logic block 84 of the preceding line probing procedure.

Note that according to the above described method in connection with FIG. 5 the processes of estimating channel characteristics and estimating range for the call modem to communicate with the answer modem are combined in a common start up procedure comprising a plurality of successive time segments. For example, there is a time segment estimating the range NT of the call modem, another time segment for estimating signal characteristics of a channel for the call modem while concurrently estimating echo characteristics of the channel for the answer modem, another time segment for estimating range NT of the answer modem and yet another time segment for estimating signal characteristics of the channel for the answer modem all concurrently estimating echo characteristics of the channel for the call modem. In the present embodiment, these four time segments are performed successively. The foregoing described method also provides for a fifth successive time segment in which the call and answer modems exchange learned information for making final decisions.

The next portion of the start up procedure to be described (see FIG. 6) is a training sequence for training the receiver and echo canceler of each of the call and answer modems. This training sequence is considered well known and outlined in the V.32 and V.32bis specifications and not considered in any way a part of the present invention except that the training sequences are performed based on the recommended carrier frequency and baud rate learned from the preceding portion of the start up procedure described in connection with FIG. 5. Thus, the description of this procedure will not require great detail, but rather just a brief overview. The procedure for the most part is currently being used in the modem 2264 marketed by Codex Corporation. Portions of the procedure are also described in the U.S. Pat. 4,987,569 issued Jan. 22, 1991 and assigned to the same assignee as the present application. In describing this procedure reference will be made to FIGS. 3, 6, 13B and 14B. With regard to the functional block diagram embodiment of FIG. 3, the ECQT and CHIRP signals are generated by the chirp generator 28, the TRN signal is generated by the train generator 30 and the rate signals R1, R2 and R3 are generated by a tone generator as are the tone signals S and $\bar{S}$.

Starting with the answer modem, after the carrier frequency and baud rate have been changed to the preferred numbers, an optional task IR may be performed to calculate a second or third far end echo of the network for use in echo cancellation. In the present embodiment, this task is not contemplated. The next task is the echo canceller quick train (ECQT) which is performed in accordance with the instructions of block 204. More specifically, a special chirp signal is transmitted by the answer modem for approximately 2 NT and a fast train or instantaneous train of the echo canceller thereof is performed based on the echo of the chirp signal. In block 206, a tone signal S is transmitted for approximately 256 T and then the phase reversal $\bar{S}$ is transmitted for a 16 T. Immediately thereafter, a special chirp sequence which is used to quickly train the equalizer of block 60 of the receiver is transmitted for 144 T. Next, in block 208 a signal TRN is transmitted for 2048 T which is used by the call modem to further train the equalizer of block 60 and the echo signal thereof by the answer modem to further train its echo canceller. Thereafter, a special rate signal R1 is transmitted and during this time the answer modem waits to detect an S signal from the call modem in the decisional block 210. When the S signal is detected, the rate signal R1 transmission is terminated and the answer modem commences transmitting zeroes according to the instructions of block 212. The answer modem then determines whether or not the S signal exists longer than or equal to MT and if so, it initializes itself for detection of the phase reversal $\bar{S}$ signal in blocks 214 and 216. During this time the answer modem is continuing to transmit zeroes. Once the signal $\bar{S}$ is detected in the decisional block 218, the block 220 is next executed to initialize the answer modem to perform an equalizer fast train with the received chirp signal from the call modem for 144 T according to a well known DFT algorithm. Thereafter, the answer modem performs a further equalizer training according to a well known least means square (LMS) algorithm for 2000 T based on the received TRN signal from the call modem in block 222.

In the next instruction block 224, the answer modem initializes itself for the detection of a special rate signal R2 transmitted from the call modem. Once the signal R2 is detected in block 224, the next instructional block 228 is executed and causes the answer modem to transmit first the S tone for 256 T, second the $\bar{S}$ tone for 16 T, and then the TRN training signal for 512 T. Thereafter, according to the instructions of block 230, the answer modem commences transmission of a special rate signal R3 which includes the information of a selected communication rate upon which both call and answer modems can agree on, i.e. common to both based on the maximum rate that they can operate at. At the same time, the answer modem initializes itself for the detection of a signal E1 indicative of the call modem agreeing to the selected rate. Once the signal E1 is detected in the decisional block 232, the answer modem terminates the transmission of the rate signal R3 and transmits the signal E2 for 8 T which is an indication to the call modem that the selected rate is accepted.

Thereafter, the answer modem transmits a frame of channel coefficients CC2 for 64 T according to the instructions of block 236 and then transmits scrambled binary zeroes B1 for 256 T according to the instructions of block 238, followed by the transmission of a flag F2 composed of a predetermined baud/bit pattern. Thereafter, the answer modem is enabled for exchange of data based on the recommended carrier frequency, baud rate and data bit rate determined in the foregoing described learning process.

Concurrently, the answer modem, after transmitting the E2 sequence according to block 234, initializes itself to detect channel coefficients CC1 from the call modem in block 242. Once the signal CC1 is detected according to the decisional block 244, the answer modem initializes itself for the detection of a flag F1 in block 245. Once the signal F1 is detected according to the decisional block 246, the answer modem initializes itself to receive data and receives data based on the recommended rates in blocks 248 and 250.

Now for the call modem. After setting the selected parameters in block 202, the call modem waits in a loop according to the decisional block 252 to detect an incoming S signal sequence from the answer modem in order to proceed with the training of its receiver and echo canceller. After detecting the S signal, the call modem initializes itself to detect the $\bar{S}$ signal in block 254 and waits for reception of the $\bar{S}$ signal in block 256. After $\bar{S}$ is detected, the call modem initializes itself for and performs an equalizer fast train utilizing the chirp signal transmitted by the answer modem for 144 T which is accomplished according to the instructions of block 258. Thereafter, the call modem performs an equalizer training according to a least mean square (LMS) algorithm for 2,000 T using the received TRN signal from the answer modem using the block 260.

Next, in block 262, the call modem initializes itself for detection of the rate signal R1 and waits in a detection loop at decisional block 264 looking for three consecutive frames which identically match in order to start transmitting the S signal sequence. Upon detection of R1 by block 264, the call modem, in block 266, transmits an S sequence for a period equal to the round trip delay measurement MT. The IR task segment may be included in the procedure at this time. Thereafter, in block 268, the call modem may transmit the echo canceller conditioning signal for a period of 2 MT in order to perform a fast train echo canceller task based on the received echo signal therefrom. Next, in block 270, the transmitter of the call modem shall transmit an S sequence for a period of 256 T, followed by a phase reversal sequence for 16 T. The phase reversal serves as a time marker to train the equalizer. The transmitter next transmits a periodic CHIRP sequence for 144 T as part of the receiver conditioning signal.

In block 272, the call modem transmits the TRN signal segment which is a sequence of scrambled binary 1's for a period of 2048 T, and then commences transmission of a rate signal R2 to indicate the available data rates in the call modem. The signal R2 takes into account the previously received rate signal R1 and may also take into account the likely receiver performance for the connection. If the connection is unacceptable, the call modem may transmit a GSTN clear down code. The transmission of R2 shall continue until the reception and detection of the incoming rate signal R3 from the answer modem. During the R2 transmission, the call modem detects the signal S from the answer modem in the decisional block 274 and initializes for the S/$\overline{S}$ time mark transition in the block 276 and waits for the time mark detection in the decisional block 278. Once the transition is detected, block 280 is executed to govern the reception of the TRN signal from the answer modem for use in fine tuning the receiver of the call modem and then the call modem is initialized for the rate signal R3 detection. The call modem waits for R3 detection in the decisional block 282 and once detected, the call modem transmits a 16 bit sequence E1 indicating it agrees with the data rate information provided it by the answer modem in the rate signal R3.

After transmission of the E1 sequence, the call modem transmits one frame of channel coefficients CC1 for 64 T in block 286 and then transmits scrambled binary zero's B1 for 256 T in block 288. Thereafter, in block 290, the call modem is governed to transmit a flag F1 composed of a dibit pattern 11, and then proceed to transmit data at the agreed upon rates of the E sequence. The scrambler and encoder 32 is initialized at this time. If, however, the rate signal R3 calls for a GSTN clear down, the call modem disconnects from the dial line and effects a clear down.

Concurrently with the transmission of the CC1 signal, the call modem is initialized to detect the E2 sequence from the answer modem in block 292. Once E2 is detected in the decisional block 294, the call modem is initialized for the detection of the channel coefficients CC2 from the answer modem in block 296. When CC2 is detected in the decisional block 298, the call modem is initialized for the detection of the flag F2 in block 300. After the flag F2 is detected in block 302, the call modem is initialized in blocks 304 and 306 to receive data and receive data according to the preferred parameters previously learned.

During the period of data communication over the communication media between the call and answer modems, a retrain request may be initiated by either modem for a plurality of reasons. For example, if either modem detects unsatisfactory signal reception, like loss of equalization, for example, a retrain shall be initiated to reassess the connection which may or may not include the line probing learning process. Another reason may be if either of the modems determines that the quality of the connection is good enough to attempt to increase data bit rate for which only a quick retrain may be needed. In the present embodiment, a tone using the signal states A, B, C, and D is used to initiate retraining and request the desired start up procedure. The signal states A, B, C, and D are separated by 90 degrees and reside at the respective phases 210, 300, 30, and 120 for the present embodiment. In describing the retraining procedures in accordance with the present invention, reference will be made to FIGS. 7–12, 13D and 14D. In the modem embodiment described in connection with FIG. 3, the tone generator 26 will generate the tones and the tone detect module 58 shall be programmed to receive and detect the tone sequences in accordance with instructions from controller 20.

Figure 7:
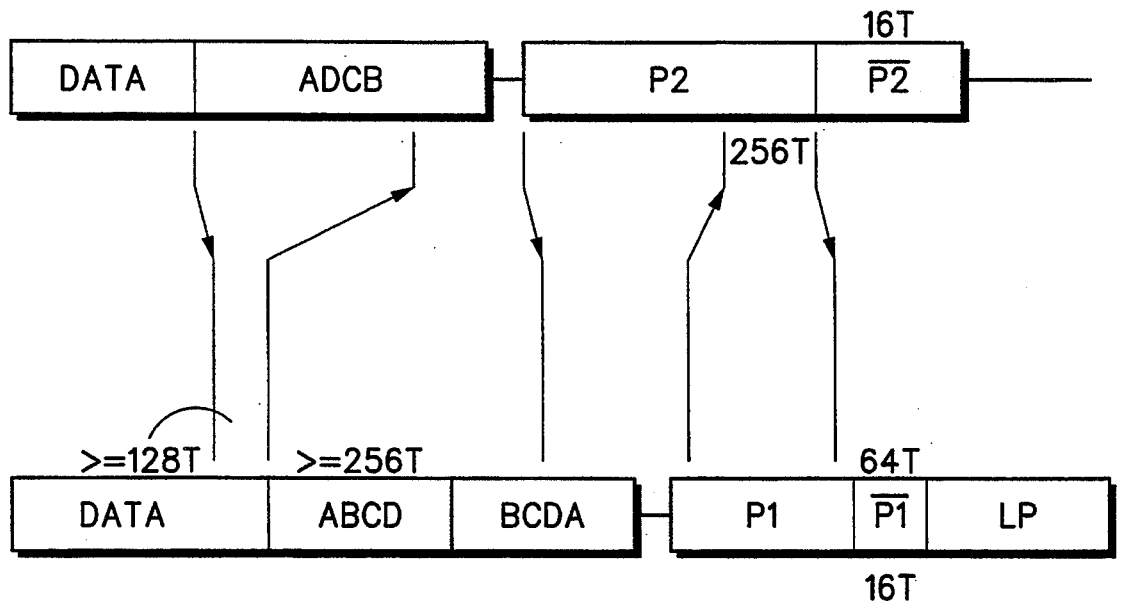

FIG. 7 represents a time segmented signal flow between a call and answer modem in which retrain and line probing are initiated and requested, respectively, by the call modem. Initially, both of the call modem and answer modem are exchanging data according to blocks 310 and 312 and are waiting in a loop to determine whether or not to request a retrain in decisional blocks 314 and 316. When the call modem detects an unsatisfactory signal reception, it shall transmit the tone in the sequence ADCB in block 318 and wait in a loop in accordance with the decisional block 320 for the detection of the signal sequence ABCD from the answer modem. Concurrently, the answer modem is waiting for reception of the signal sequence ADCB in decisional block 322 and when that signal sequence is detected, the answer modem delays for a period of at least 128 T in block 324 and then transmits the signal sequence ABCD for at least a period of 256 T in block 326.

When the call modem detects the sequence ABCD in the decisional block 320, it decides whether or not it desires a line probe retrain in block 328. Since this is the case in the present example, the call modem terminates transmission for a period of approximately 20 T and then changes its symbol clock T to 2400 Hz to begin executing at the start of the program described in connection with FIG. 13A commencing with the transmission of the tone P2 in block 102. Since the answer modem is not requesting a line probe retrain, its decision of block 330 causes program flow to execute the instructions of block 332 which initiates transmission of the signal sequence BCDA. During the time the answer modem is transmitting the signal sequence BCDA, it awaits detection of either a signal sequence DCBA or the tone P2 in the decisional block 334 or the detection of a loss of carrier in the decisional block 336. In the present case, the detection of the tone P2 returns the program to the start of the programing sequence described in 14A with the commencement of the tone P1 after a predetermined period of silence. Thereafter, the line probing and ranging training tasks are carried out in accordance with the instructions of FIGS. 13A–C and 14A–C as described hereabove.

Figure 8:
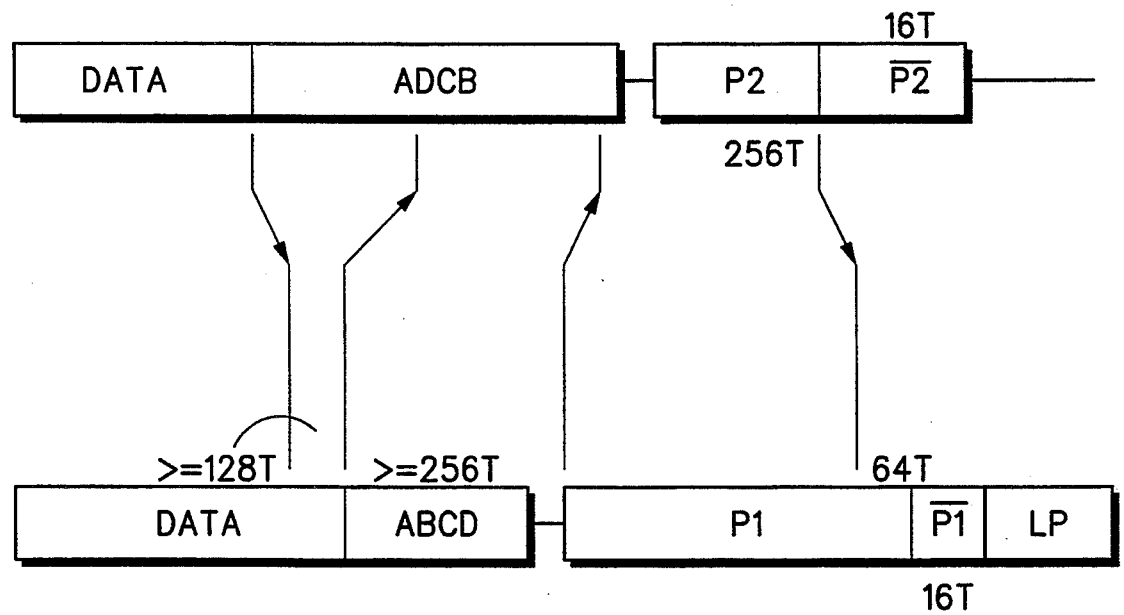

In the example of FIG. 8, the call modem initiates the retrain procedure, but the answer modem requests the line probing training sequence. In this example, the call modem will execute the blocks 310, 314, 318, and 320 as described above and similarly the answer modem shall execute the blocks 312, 322, 324, and 326. But since the answer modem is the modem which is requesting the line probe retrain, it shall transfer its program execution via the decision block 330 to the start of the program of FIG. 14A wherein it commences transmission of the tone P1 after ceasing transmission for approximately 20 T. The modulation clock T is changed to 2400 Hz for the transmission for the tone P1. The call modem awaits the detection of either the tone sequence B, C, D, A or the tone P1 in the decision block 340 as well as a loss of carrier in the decision block 342. In the present case, when the tone P1 is detected, the call modem transfers program execution to the start of the training sequence of FIG. 13A in which it commences transmission of the tone P2 in block 102 after a silence period of approximately 20 T. Note that the modulation clock is changed to 2400 Hz for the transmission of the tone signal P2. Thereafter, the call modem and answer modem will proceed through the training sequence of FIGS. 13A and 14A.

Figure 9:
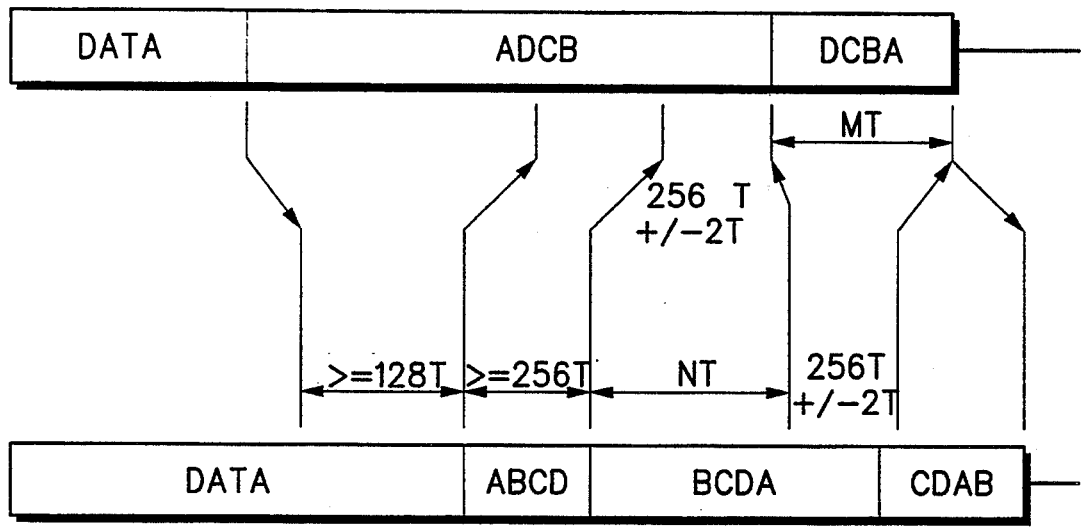

In the example of FIG. 9, the call modem is initiating retraining most likely as a result of the possibility that the quality of the line connection is good enough to sustain a higher data bit rate, but no line probing training sequence is requested. Once again, the call modem executes the blocks 310, 314, 318, and 320 and the answer modem executes the blocks 312, 322, 324, and 326. When the call and answer modems reach the decisional blocks 328 and 330, respectively, neither is requesting a line probe retrain. Therefore, the answer modem transmits the tone sequence B, C, D, A in block 332 and starts the range counter NT. Thereafter, the call modem detects the tone sequence BCDA in block 340 and delays for a period of 256 T +/−2 T in block 344. During the delay, the call modem tests for carrier loss in block 346 and if carrier loss is detected, program execution is transferred to the start of the program of FIG. 13A. With no carrier loss and after the delay of 256 T, the call modem transmits the tone sequence D, C, B, A in block 348 and awaits the detection of the tone sequence C, D, A, B from the answer modem in the decisional block 350. In turn, the answer modem detects the tone sequence D, C, B, A in block 334 and stops the range counter to compute the range NT in block 352. The answer modem next waits for a delay of 256 T +/−2 T and then transmits the tone sequence C, D, A, B. In decisional block 354, the answer modem awaits detection of the tone sequence D, C, B, A from the call modem. Concurrently, upon the transmission of the tone sequence D, C, B, A in block 348, the call modem starts its range counter MT and with the detection of the tone sequence C, D, A, B in block 350, the call modem terminates transmission of the tone sequence D, C, B, A and computes the range MT in block 356. Thereafter, the program execution of the call modem is transferred to the start of the quick retrain sequence of FIG. 13B omitting the line probing and ranging tasks of FIG. 13A. Simultaneously, the answer modem detects the tone sequence D, C, B, A in block 354 and terminates transmission for the tone sequence C, D, A, B in block 355 and returns program execution to the retrain sequence at the start of the program of FIG. 14B also omitting the line probing and ranging tasks of FIG. 13B.

Figure 10:
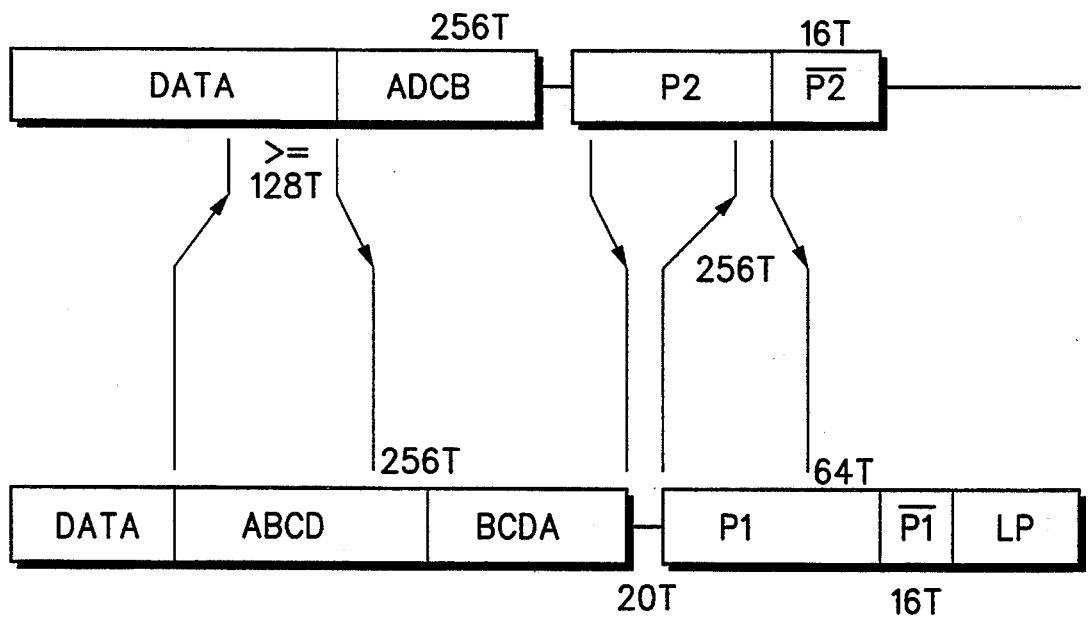
Figure 11:
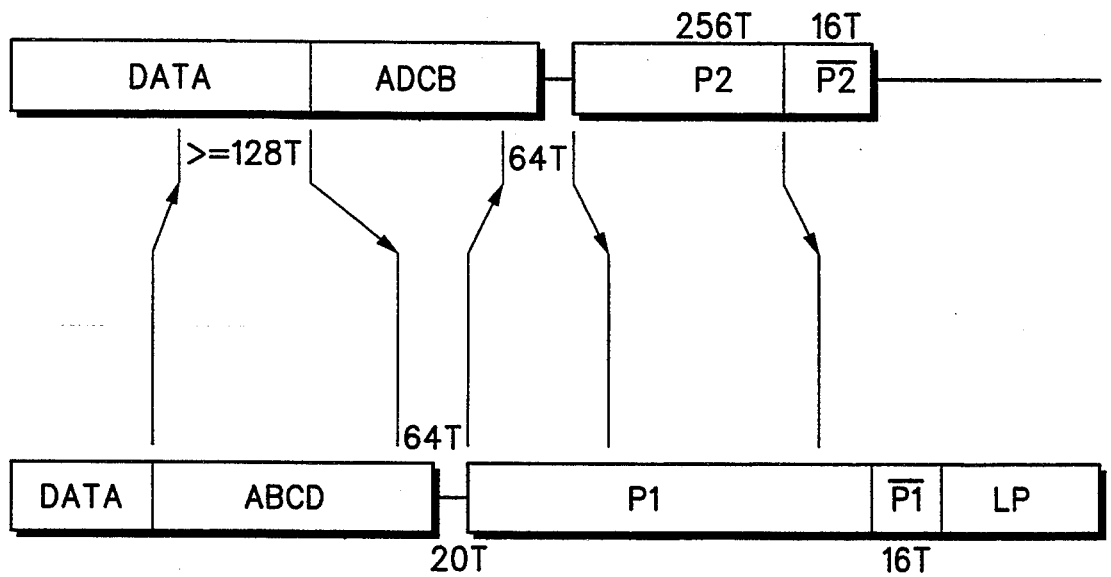
Figure 12:
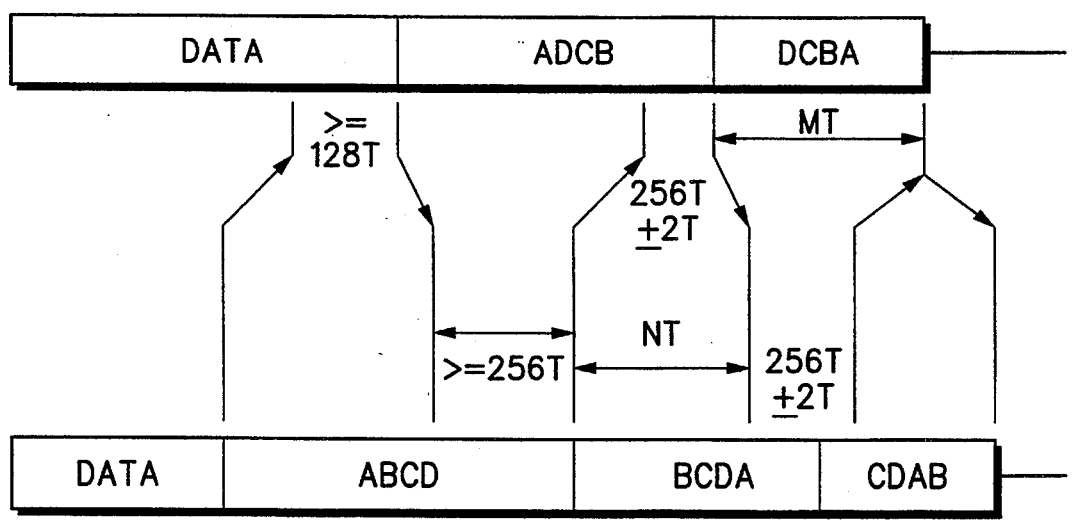
Figure 13A:
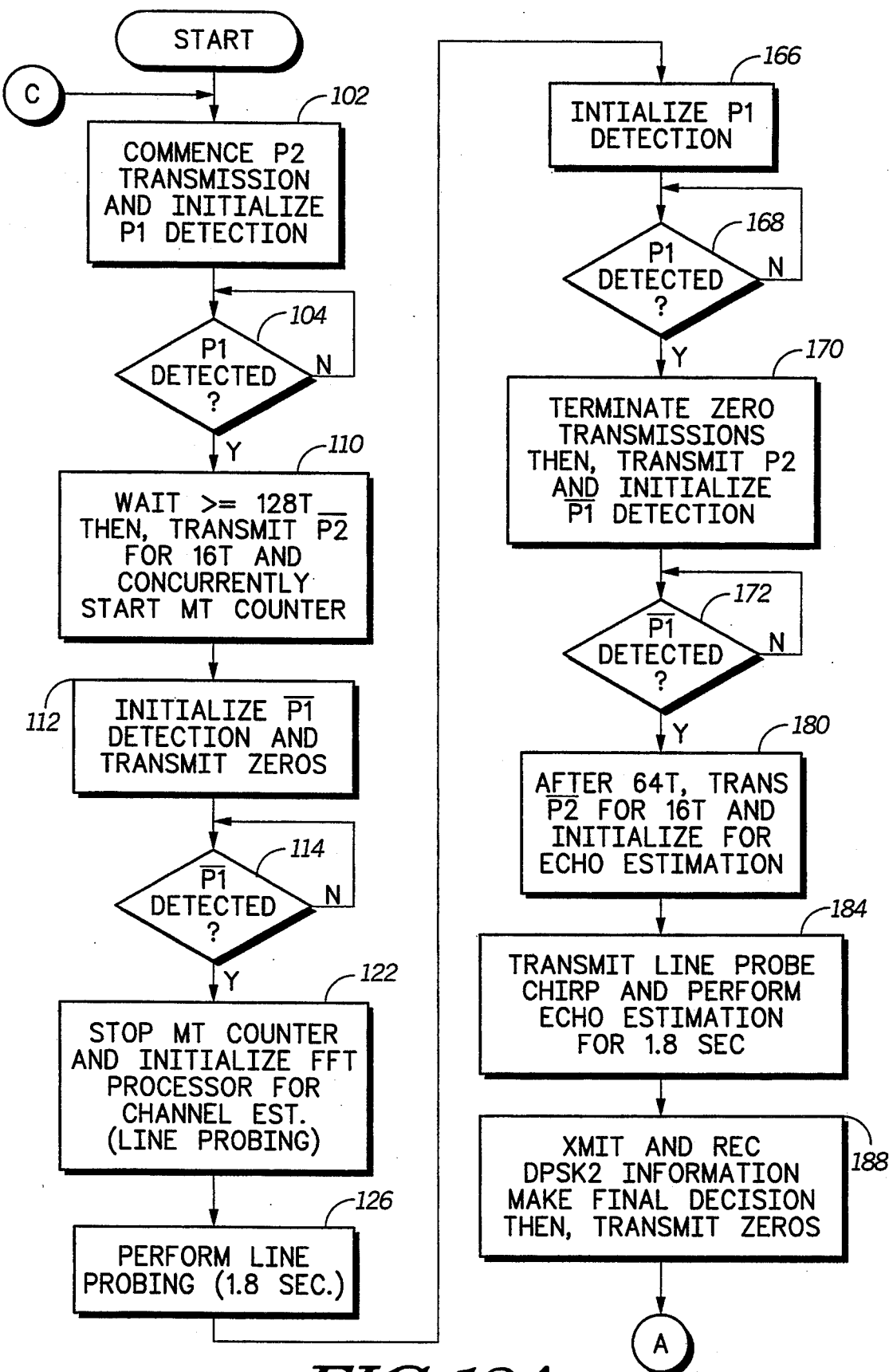
FIGS. 13A–13D represents suitable software programming for embodying the functional modules of the modem of FIG. 3 operating in a call mode.
Figure 13B:
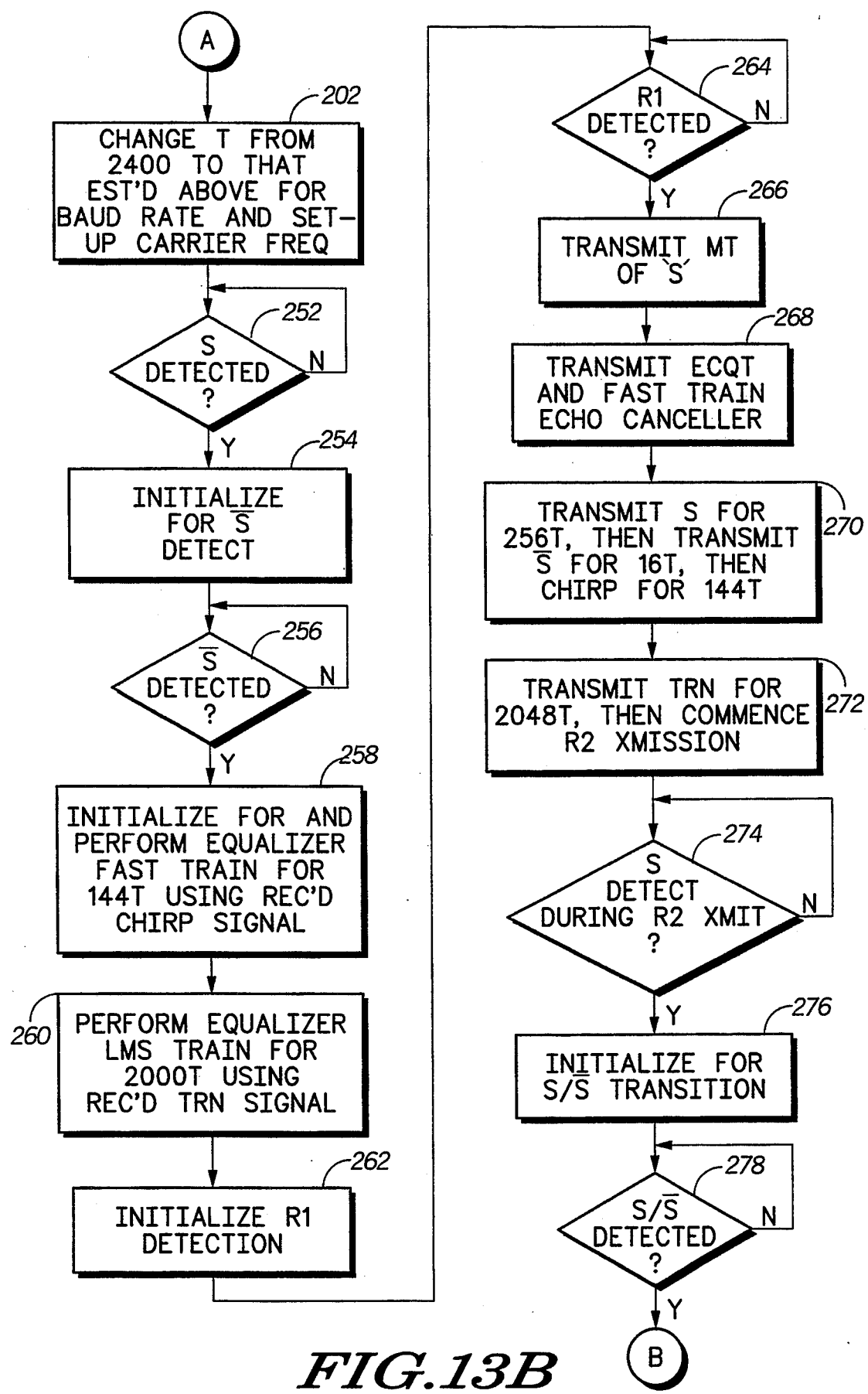
Figure 13C:
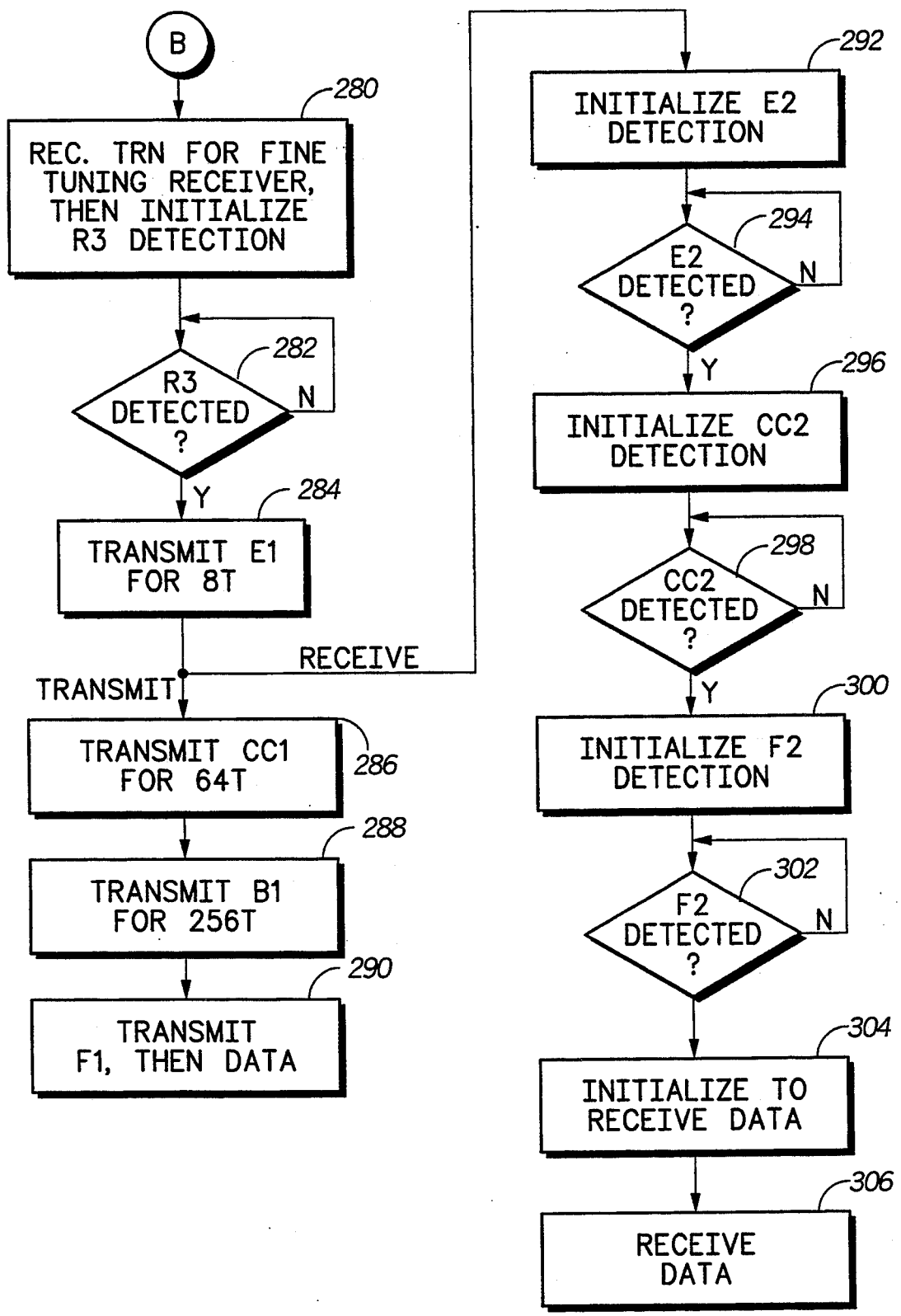
Figure 13D:
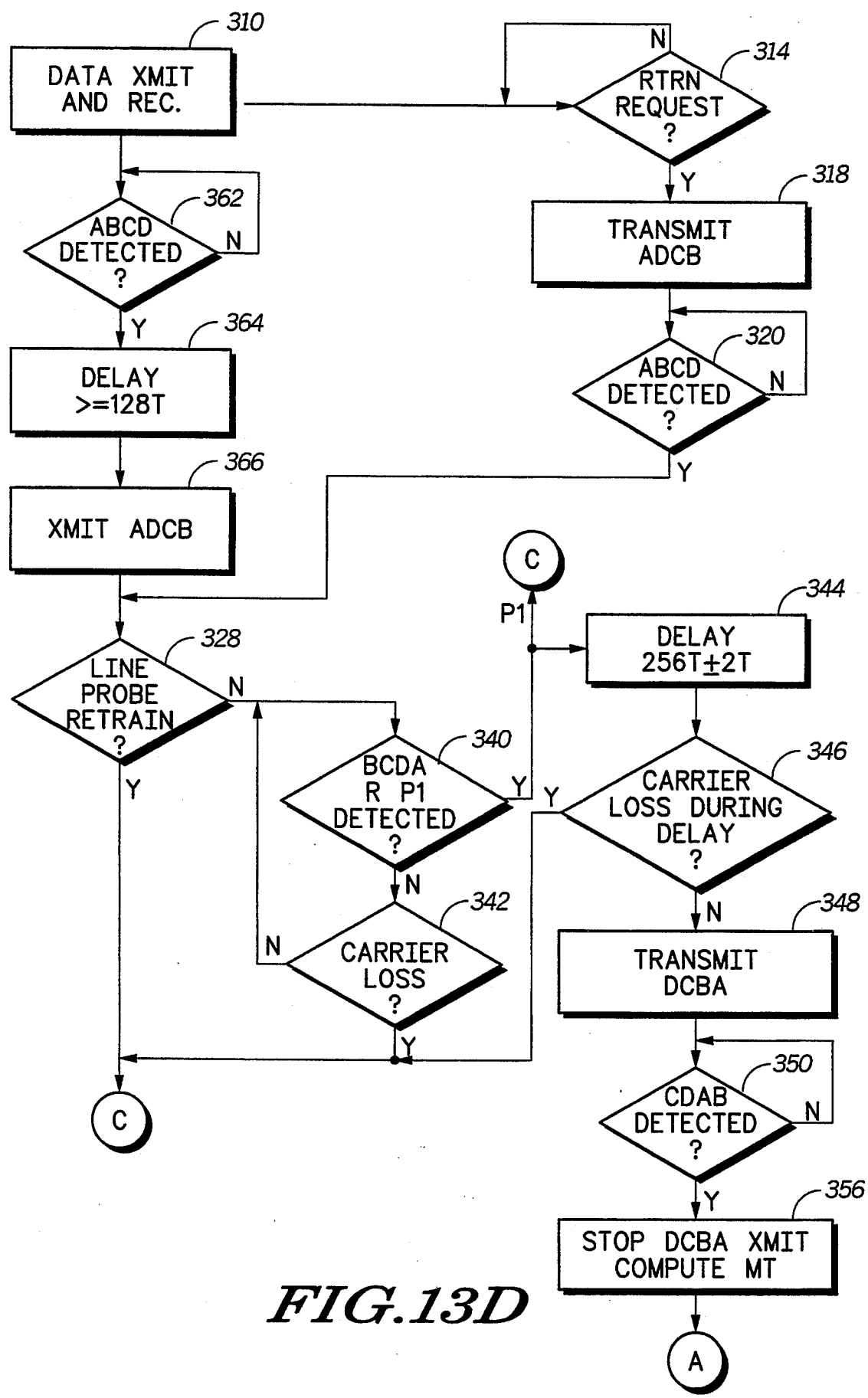

In the examples of FIGS. 10, 11 and 12, the answer modem is the modem which is initiating a retraining sequence. The example of FIG. 10 is one in which the answer modem detects an unsatisfactory signal reception and not only terminates data communication, but also initiates both retrain and line probing sequences. Referring to FIG. 10, the blocks 312 and 316 are executed resulting in the transmission of the tone sequence ABCD in accordance with the instructions of block 358. The answer modem then waits for the reception and detection of the tone sequence ADCB from the call modem in the decisional block 360. Simultaneously, the call modem is awaiting detection of the tone sequence ABCD in the decisional block 362 and when detection is made, a delay of at least 128 T is activated in block 364 and thereafter, the call modem transmits the tone sequence ADCB in block 366. Upon detection of the tone sequence ADCB in block 360, the answer modem, which is not requesting line probe retrain, executes the block 332 next to cause the transmission of the tone sequence BCDA after a delay of approximately 256 T and then waits for the detection of either the tone sequence DCBA or the tone P2 in the decisional block 334 or loss of carrier (block 336). Concurrently, since the call modem is requesting a line probe retrain, program execution is diverted from the decisional block 328 to the start of the program in FIG. 13A in which the tone P2 is transmitted after a silence period of approximately 20 T. The symbol for modulation clock is changed for the transmission of P2 to 2400 Hz. When the answer modem detects the tone P2 in the decisional block 334, it diverts program execution to the start of the program of FIG. 14A in which the tone P1 is transmitted after a silence period of approximately 20 T at the new symbol or modulation clock of 2400 Hz. Thereafter, both the answer and call modems continue program execution as described in connection with FIGS. 13A and 14A.

Figure 14A:
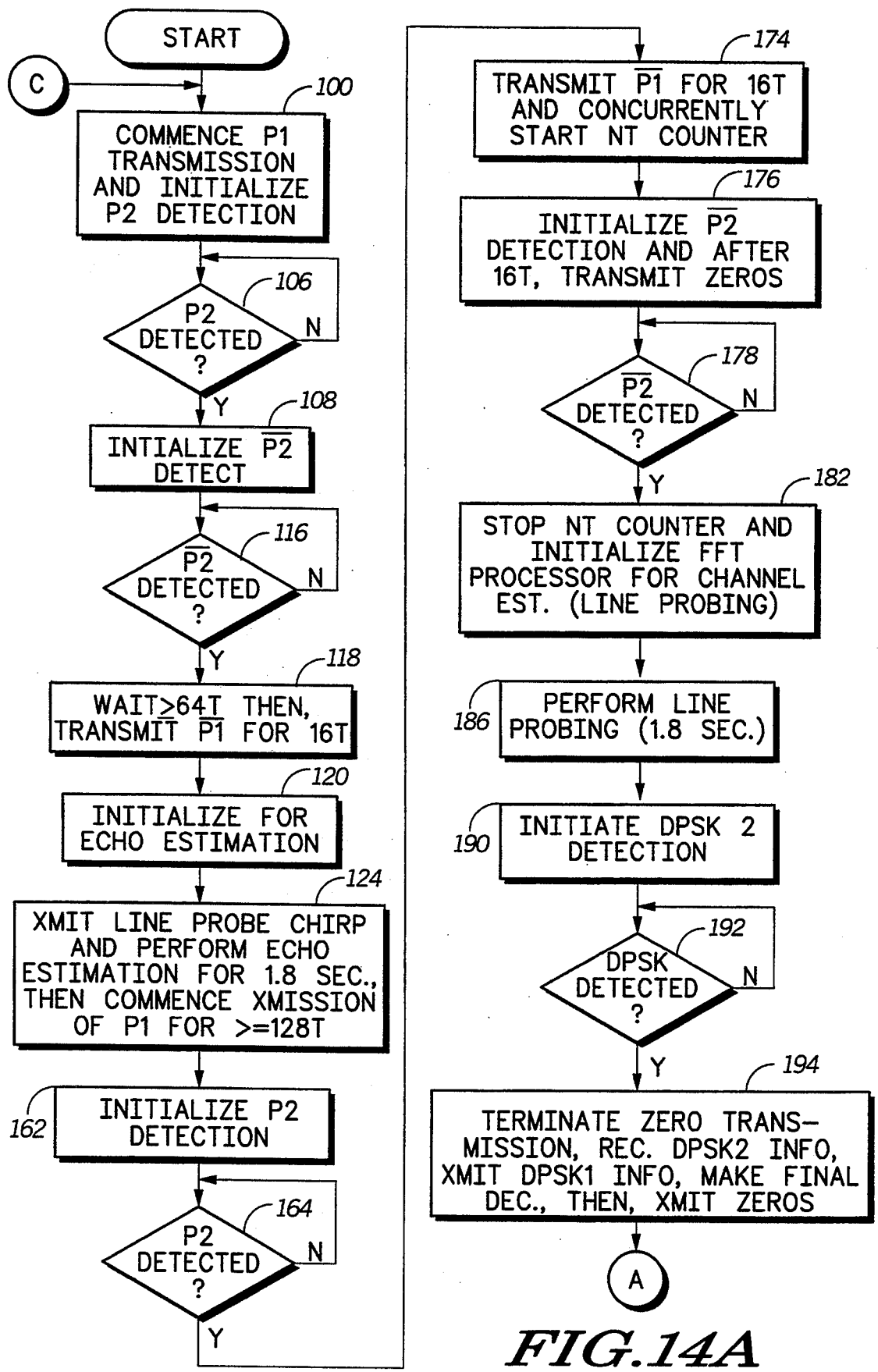
FIGS. 14A–14D depict suitable software programing for embodying the functionally modules of the modem of FIG. 3 operating in an answer mode.
Figure 14B:
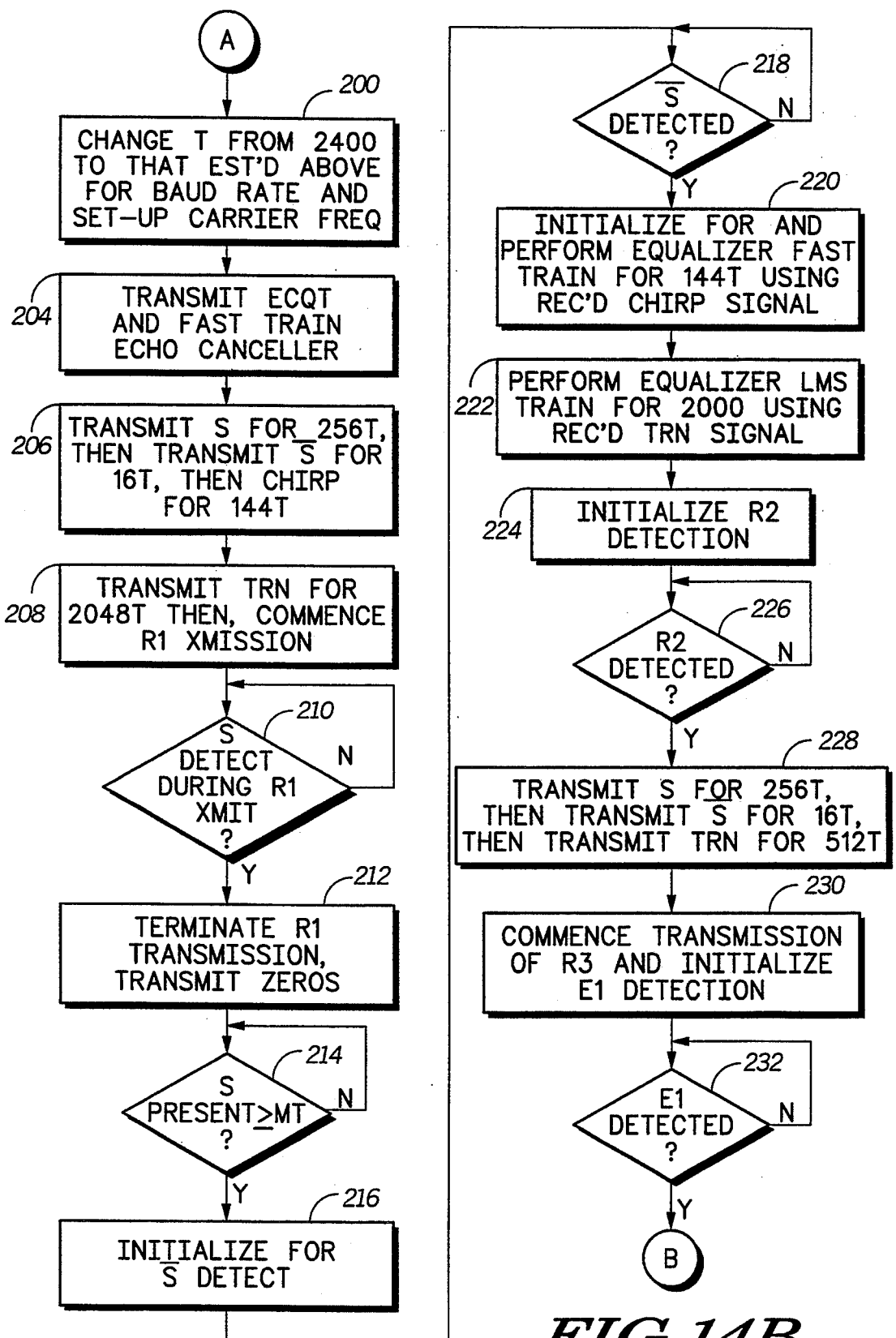
Figure 14C:
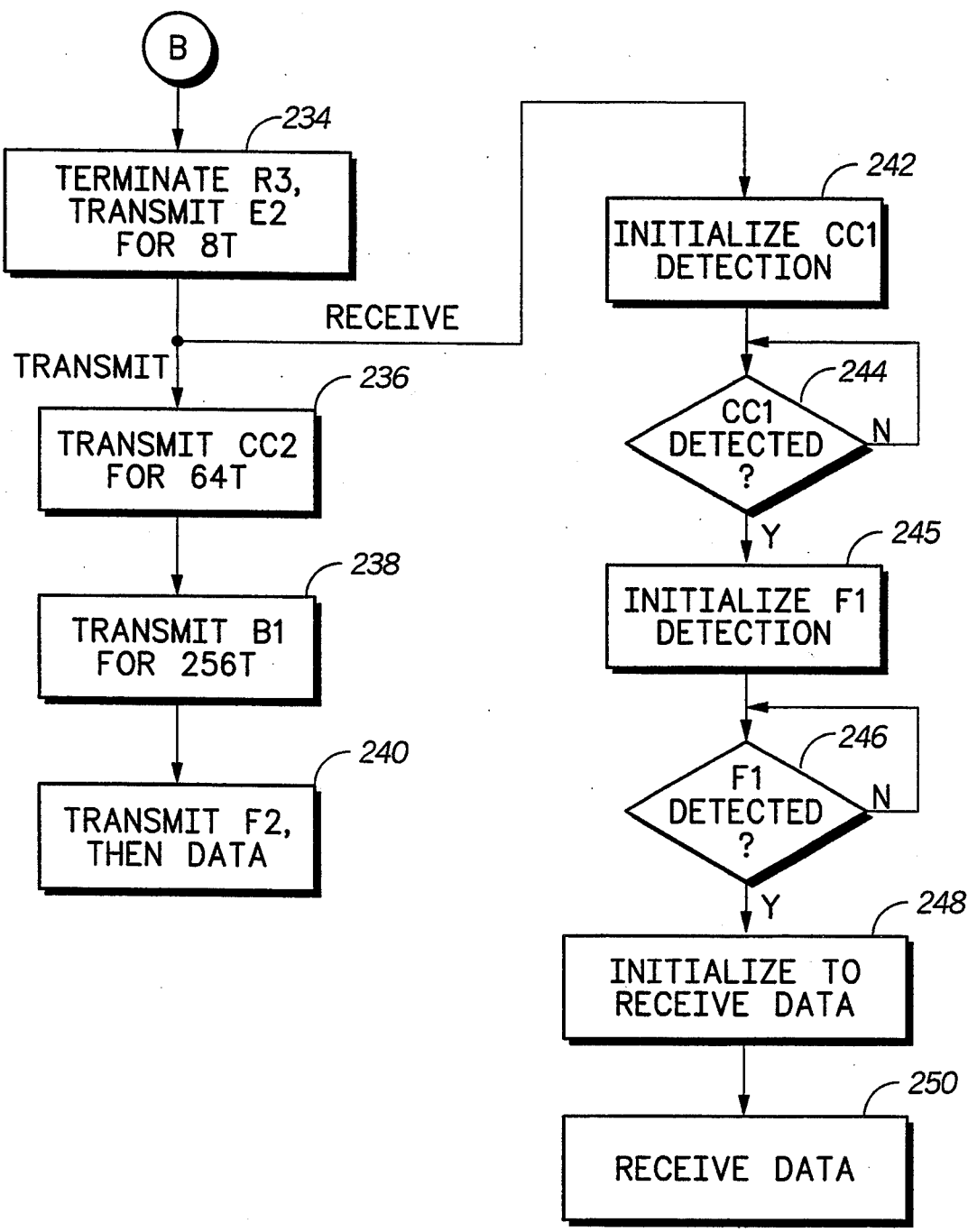
Figure 14D:
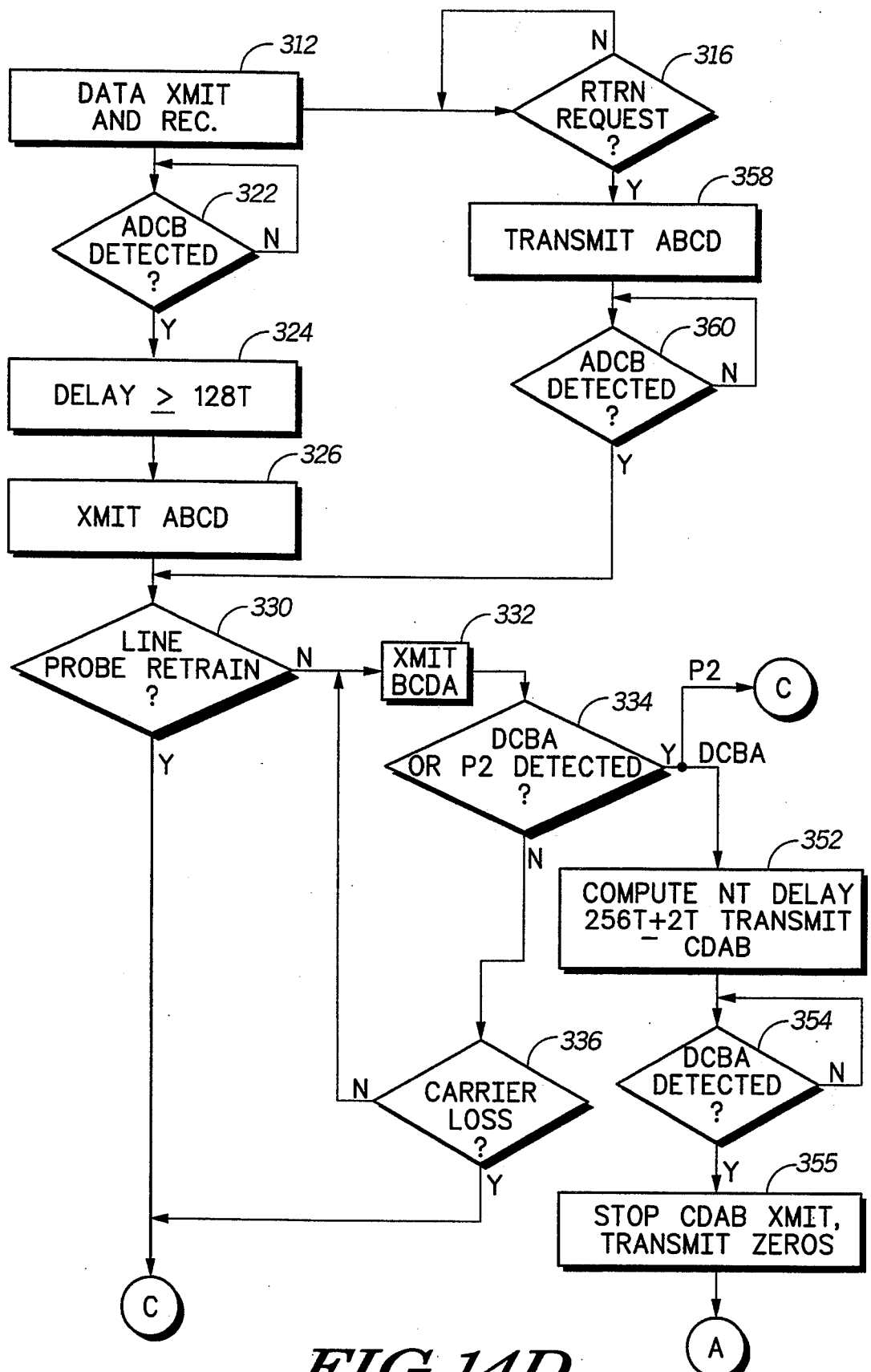

In the example of FIG. 11, it is the answer modem that is requesting a line probe retrain; therefore, after detecting the tone sequence ADCB in the decisional block 360, the answer modem diverts the program execution via block 330 to the start of the program of FIG. 14A as described hereabove. When the call modem detects the tone P1 in the decisional block 340 it diverts program execution to the start of the program of FIG. 13A after delaying for a period of 64 T. Thereafter, both the call and answer modems operate in accordance with the program execution of FIGS. 13A and 14A.

In the example of FIG. 12, no line probe retrain is requested by either the call and answer modem. Therefore, the call and answer modems shall go through the same sequence for computing their respective ranges MT and NT as described hereabove in connection with the example of FIG. 9. Thereafter, program execution for both the call and answer modem will proceed starting at the FIGS. 13B and 14B omitting the training sequences of FIGS. 13A and 14A.

Another aspect of the present invention involves the data communication between a call and answer modem over a primary communication media connection, like a leased line of a telephone network, for example, wherein a failure in the connection is detected. Normally, the primary connection would be switched to a secondary connection like a dial-up line of a telephone network as part of the GSTN. However, in the case in which the carrier frequency, baud rate and data bit rate parameters of the communication have been optimized in accordance with the above described learning process, it is not adequate to select any secondary connection, but rather important to prequalify the connection so as to maintain the optimum parameters in continuing data communication between the call and answer modems.

Therefore, this aspect of the present invention deals with prequalifying a secondary connection of a predetermined plurality of secondary connections with regard to the optimized communication parameters prior to affecting the switch over. Likewise, when operating over the qualified secondary connection, it is desirable to test and qualify the primary connection in order to restore communication over the primary connection at some later time. This method shall be described in connection with the flowchart of FIG. 15. The process of switching from a primary connection to a secondary connection and restoring the primary connection is considered well known and will not be described in detail in the instant application.

Figure 15:
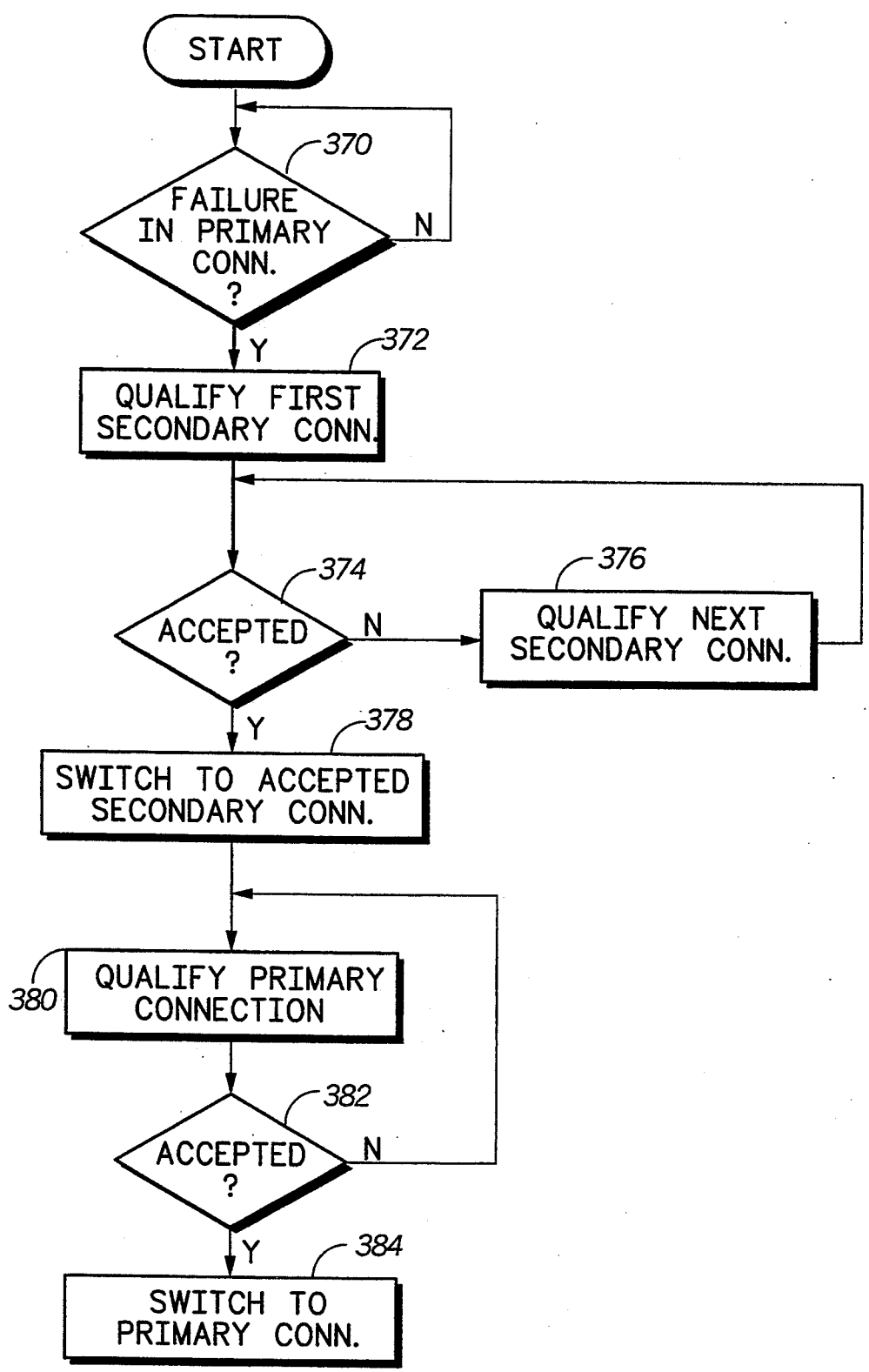
FIG. 15 depicts a method flowchart of a suitable embodiment of another aspect of the present invention.

Referring to FIG. 15, the method starts in the decisional block 370 where it is determined whether or not there is a failure in the primary communication media connection over which the call and answer modems are presently communicating. When a failure is detected, the block 372 is next considered in which a first of the plurality of secondary connections is qualified according to the embodiment described in FIG. 5 and flowcharts FIGS. 13A and 14A. If it is determined that the selected secondary selection can support communication at the desired combination of carrier frequency, baud rate and data bit rate, it is accepted by the decisional block 374; otherwise, the next secondary connection of the plurality is qualified and determined whether or not acceptable according to the same criteria in block 376. Once the secondary connection is accepted, communication between the call and answer modems are switched to the secondary connections from the primary connection in block 378 and thereafter, communication continues over the accepted secondary connection. Thereafter, the primary connection is tested and qualified in accordance with the same procedures, i.e. FIG. 5 and FIGS. 13A and 14A, in block 380. And if found to support the aforementioned combination of communication parameters at some later time, the primary connection is considered accepted by decisional block 382 and as a result of the acceptance, communication between the call and answer modems is restored to the primary connection in block 384. And the method procedure continues back at the decision block 370 as described hereabove.

It is understood that in connection with this last aspect of the present invention, the call and answer modems might may be either 2 or 4 wire modems, however, in the case of a 4 wire modem there is no need for considering channel characteristics with respect to echo transmissions. Therefore, that part of the learning sequence may be omitted.

While the aspects of the present invention have been described in connection with a preferred embodiment or embodiments, it is understood that additions, deletions, and modifications may be made thereto without deviating from applicants' invention. Accordingly, the invention should not be limited to any specific embodiment, but rather construed in accordance with the recitation of the appended claims hereto.

We claim:

1. In a data communications network, method of switching between primary and secondary communication media connections of said network, which connections are used for communication by first and second modems coupled to said network, said method comprising the steps of:
   (a) communicating data between said first and second modems over said primary communication media connection;
   (b) detecting a failure in said primary connection;
   (c) in response to said failure detection, qualifying a secondary communication media connection, wherein qualifying a secondary communication media connection includes the steps of:
      (c1) selecting one secondary connection from a plurality of secondary connections;
      (c2) determining if said selected secondary connection can support communication at a desired combination of carrier frequency, baud rate and data a bit rate in order to accept said selected secondary connection;
      (c3) qualifying said selected secondary connection upon acceptance; and
      (c4) upon rejection of said selected secondary connection, selecting another secondary connection of said plurality and repeating the steps of (c2) through (c4);
   (d) switching communication of said first and second modems from said failed primary to said qualified secondary communication media connection;
   (e) while communicating data between said first and second modems over said qualified secondary communication media connection, qualifying said primary communication media connection, wherein qualifying said primary communication media connection includes the steps of:
      (e1) determining if said primary connection can support communication at a desired combination of carrier frequency, baud rate and data bit rate in order to accept said primary connection;
      (e2) qualifying said primary connection upon acceptance; and
      (e3) upon rejection, maintain the communication of data over said selected secondary connection; and
   (f) restoring communication of said first and second modems from said secondary to said qualified primary communication media connection and repeating step (a).

2. The method in accordance with claim 1 wherein the primary connection being communicated over by the first and second modems is a leased line connection.

3. The method in accordance with claim 1 wherein the secondary connection being switched to is a dial-up line connection.

4. The method in accordance with claim 1 wherein step (c2) includes determining if the selected secondary connection can support a minimum data bit rate at a prespecified carrier frequency and baud rate for acceptance.

5. The method in accordance with claim 4 wherein step (k) includes determining if the primary connection can support a minimum data bit rate at a prespecified carrier frequency and baud rate for acceptance.

* * * * *